United States Patent
Eto et al.

(10) Patent No.: US 8,456,974 B2
(45) Date of Patent: Jun. 4, 2013

(54) RECORDING ADJUSTING METHOD, INFORMATION RECORDING AND REPRODUCING DEVICE, AND INFORMATION RECORDING MEDIUM

(75) Inventors: Soichiro Eto, Tokyo (JP); Takahiro Kurokawa, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/334,215

(22) Filed: Dec. 22, 2011

(65) Prior Publication Data

US 2012/0243392 A1  Sep. 27, 2012

(30) Foreign Application Priority Data

Mar. 24, 2011 (JP) .................................. 2011-066405

(51) Int. Cl.
*G11B 7/00* (2006.01)

(52) U.S. Cl.
USPC ..................... 369/53.23; 369/47.53; 369/53.1

(58) Field of Classification Search
USPC ............... 369/116, 47.5, 47.51, 47.52, 47.53, 369/47.28, 275.3, 47.1, 53.1, 53.12, 53.23, 369/47.17, 44.28, 44.32

See application file for complete search history.

(56) References Cited

U.S. PATENT DOCUMENTS

| 5,592,451 | A * | 1/1997 | Shikunami | 369/53.16 |
| 7,755,989 | B2 * | 7/2010 | Kim | 369/47.27 |
| 2010/0083295 | A1 * | 4/2010 | Eto et al. | 720/695 |
| 2010/0214887 | A1 * | 8/2010 | Spruit et al. | 369/44.28 |
| 2010/0260025 | A1 | 10/2010 | Minemura et al. | |

OTHER PUBLICATIONS

Masakazu Ogasawara, et al., 16 layers Write Once Disc with a Separated Guide Layer, ISOM2010,Th-L-07, Pioneer and TDK Corporation, Japan.

* cited by examiner

*Primary Examiner* — Nabil Z Hindi
(74) *Attorney, Agent, or Firm* — Antonelli, Terry, Stout & Kraus, LLP.

(57) ABSTRACT

The present invention achieves tracking servo using a recording signal on a grooveless optical disc. Trial writing signals are written by using multiple recording conditions, and a recommended recording condition having favorable qualities of a reproduction signal and a tracking error signal is determined based on the trial writing signals. Then, recording is performed by using the recommended recording condition. In addition, by using a recording condition determined based on an optimum power control performed prior to the recording, signals are recorded adjacent to each other in at least two tracks. Signals are recorded by using the determined recording condition under which a tracking error signal quality obtained from the recording signal matches a desired value of a tracking error signal quality of the medium.

19 Claims, 15 Drawing Sheets

Fig. 11A

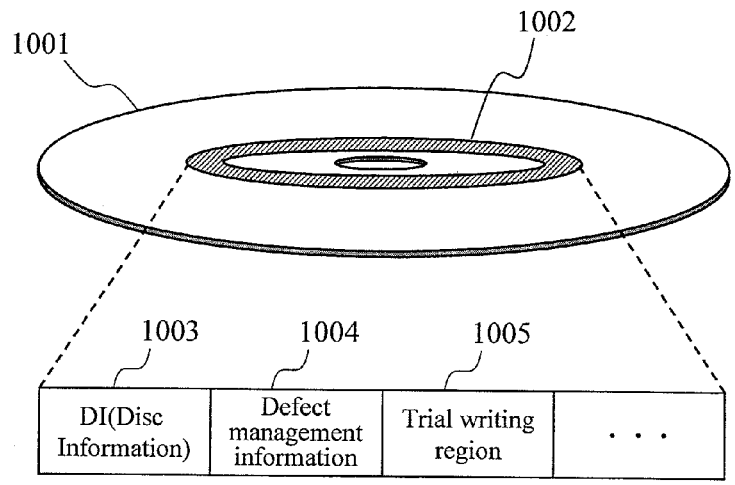

| | | | |
|---|---|---|---|
| DI(Disc Information) | Defect management information | Trial writing region | ... |

Fig. 11B

| Item | Contents |
|---|---|
| DI Header | DI Format, etc |
| Medium information | Recording layer structure, Medium structure, etc |
| Signal polarity | Push-pull signal polarity, Recording signal polarity, etc |
| Recording condition information | Recording rate, etc |
| Reproduction condition information | Maximum dc reproduction power, HF condition, etc |
| OPC parameters | Information on PIND, mIND, Rho, Epsilon BW, Epsilon C, Epsilon S, Kappa, Beta and desired TES value, etc |
| Write Strategy information | Information on recommended recording waveform, etc |
| Disc manufacturer ID | Identification of manufacturer, etc |
| Disc type | Disc type, etc |
| ... | ... |

RECORDING ADJUSTING METHOD, INFORMATION RECORDING AND REPRODUCING DEVICE, AND INFORMATION RECORDING MEDIUM

CLAIM OF PRIORITY

The present application claims priority from Japanese patent application JP 2011-066405 filed on Mar. 24, 2011, the content of which is hereby incorporated by reference into this application.

BACKGROUND OF THE INVENTION

1. Field of the Invention

The present invention relates to a recording adjusting method and a recording power adjusting method as well as an optical information recording and reproducing device and an information recording medium for performing the recording adjusting method and the recording power adjusting method.

2. Description of the Related Art

Currently, a compact disc (CD), a digital versatile disc (DVD), a blu-ray disc (BD), and the like have been widely used as optical discs which are optical information recording media. In recent years, a BDXL has also been commercialized, which is an advanced BD having an increased number of data layers, i.e., three or four data layers. There are various types of optical discs, such as read only memory (ROM), recordable (R), and rewritable (RE) discs.

Information is recorded in or reproduced from the optical disc by using laser light. In recording information in the recordable or rewritable optical disc, laser light is emitted onto a data layer to change the optical characteristics of the data layer. At this time, the data layer experiences formation of a mark which is a region having changed optical characteristics and a space which is a region having unchanged optical characteristics. Information is recorded therein by combining marks and spaces. In contrast, in reproducing information, laser light having less power than in recording is emitted onto the data layer, and an amount of reflection light therefrom is detected. The reflection light amount varies depending on whether the laser light spot is on the mark or the space. Thus, the variation of the reflection light amount is used to reproduce the information.

During the aforementioned recording and reproduction performed on the optical disc, the position of a light spot is controlled by focus servo and tracking servo. The focus servo is a control of moving the focus of laser light in a vertical direction of the optical disc to always keep the focus on the data layer of the optical disc. The tracking servo is a control of moving the light spot in a horizontal direction (an in-plane direction) of the optical disc to cause the light spot to always follow a row including the marks and the spaces (hereinafter, referred to as a track). These controls enable the light spot to scan the track of the data layer at all the time during the recording and reproduction.

The light spot position control by the tracking servo is performed based on a tracking error signal (TES) correlated with an amount of offset from a track. The TES is a signal calculated from a diffraction pattern of reflection light from the track. Typical examples of a TES generation method are a differential phase detection (DPD) method and a push-pull (PP) method. The DPD method uses diffractions caused by marks and spaces included in the track, and thus is mainly used for a ROM optical disc having marks formed in the form of recessed pits. The PP method is mainly used for recordable and rewritable optical discs. The PP method uses diffractions caused by a groove which is a guide groove in each of tracks provided in data layers of the discs.

By using FIG. 1, a description is given of a principle of generation of a TES based on the PP method utilizing diffraction light caused by a groove (hereinafter, referred to as a PP-TES). FIG. 1A is a schematic diagram of a PP-TES generation circuit including: a photo detector 101a divided into two regions in parallel with a groove; and a subtractor 102a. The photo detector 101a receives reflection light in regions A and B, and the light intensities thereof are varied by the diffraction caused by the groove, according to an amount of offset of the light spot from the groove. Hence, the subtractor 102a calculates a difference between signals from A and B of the photo detector 101a, so that a PP-TES is generated. FIG. 1B-1 is a schematic diagram showing a case where a spot 101b moves while crossing grooves 102b, and FIG. 1C is a schematic diagram of a PP-TES generated at this time. As seen from FIG. 1C, when the light spot is on the center of each of the grooves, the PP-TES is at the zero-crossing of a falling edge (or a zero crossing of a rising edge, depending on the groove phase). Thus, the light spot 101b is kept on the track under such control that the PP-TES can always coincide with the zero crossing. Such tracking servo can be performed by using a PP-TES generated also from pits 104b of a ROM optical disc as shown in FIG. 1B-2. In this case, a light spot 103b passing a pit causes the PP-TES to have a certain amplitude, whereas the light spot 103b passing between pits causes the PP-TES to have an almost zero amplitude. However, the spot moving rate is higher in a parallel direction of the tracks than in a vertical direction thereof, which is high enough to obtain an average PP-TES similar to that in FIG. 1C.

The DPD method is a method of generating a TES from pits of a ROM optical disc more stably than the PP method. A method of generating a TES used in the DPD method (hereinafter, referred to as a DPD-TES) will be described by using FIG. 2. FIG. 2A is a schematic diagram of a DPD-TES generation circuit. The DPD method uses a photo detector 201a divided into four regions. Thus, the reflection light received by the photo detector 201a is divided into four components A, B, C, and D. The light intensity ratio between a sum of the diagonal components A+C and a sum of the diagonal components B+D varies depending on the diffraction caused by a pit edge. Hence, on the assumption that a light spot 201b passes a row including pits 202b as in FIG. 2B, a description is given below of a DPD-TES generated at this time.

Firstly, adders 202a generate an (A+C) input signal S211 and a (B+D) input signal S212 from signals of light received by the detector 201a. FIG. 2C schematically shows the input signals. The relative position of the signals of light at pit edges varies depending on the offset directions of the light spot from the track. The signals S211 and S212 are processed to have a boost in high frequency components thereof by high-frequency boosters 203a and are respectively converted into an A+C binary signal S221 and a B+D binary signal S222 by binarizers 204a. FIG. 2D schematically shows the binary signals S221 and S222. By using the binary signals S221 and S222, a phase difference detector 205a detects a phase difference between the A+C binary signal S221 and the B+D binary signal S222. The phase difference detector 205a generates a leading phase pulse signal S231 in a case of a phase lead of the A+C binary signal S221, or generates a lagging phase pulse signal S232 in a case of a phase lag of the A+C binary signal S221. FIG. 2E schematically shows the signals S231 and S232 as well as signals S241 and S242 obtained by processing of LPFs 206a at the subsequent stage.

Lastly, a subtractor 207a calculates a difference between the signals S241 and S242, so that a DPD-TES is generated.

FIG. 2F schematically shows the DPD-TES generated in the case shown in FIG. 2B as well as a differential signal S250 of the leading phase pulse signal S231 and the lagging phase pulse signal S232. The DPD-TES generated in the aforementioned manner is at the zero crossing of a falling edge when the light spot 201b is on the center of the track. Thus, the light spot 201b can be kept on the track under such control that the DPD-TES can always coincide with the zero crossing.

The tracking servo is controlled by the TES represented by those described above, and thus conventional optical discs have achieved highly accurate positioning in recording and reproducing information.

In efforts made to achieve a much larger volume optical disc in recent years, methods of increasing a capacity per disc by further increasing data layers from those of a BDXL have been reported in academic meetings and the like. A (grooveless) method of eliminating a groove structure from a data layer has also been proposed to simplify a production process for a medium with increased data layers. Non-patent document 1 reports a grooveless recordable optical disc having 16 data layers. A disc using this method has a servo surface of a groove structure in addition to the 16 data layers. Moreover, a recording and reproducing device includes an additional laser having a different wavelength for exclusive servo use, wherein the relative position of the laser and the spot used for recording and reproducing is fixed. Thereby, while performing tracking servo on the servo surface of the disc with the laser for exclusive servo use, the recording and reproducing device can perform recording or reproduction by using a recording or reproduction spot moving in synchronization with a servo spot, and thereby practically achieves the tracking servo on each data layer.

PRIOR ART DOCUMENT

Patent Document

Patent Document 1: US 2010/0260025 A1

Non-Patent Document

Non-Patent Document 1: Pioneer, TDK, 16 layers Write Once Disc with a Separated Guide Layer, ISOM10' Th-L-07

SUMMARY OF THE INVENTION

When medium replaceability is taken into consideration for a grooveless optical disc, optical disc devices might have different relative positions of laser for servo and laser for recording and reproduction. In such a case, even though the tracking servo is performed on a servo surface, an intended track of a data layer cannot be scanned accurately. In addition, when laser light enters a disc obliquely because of inclination of the disc, there is a change in the relative position of spots of the laser for servo and the laser for recording and reproduction in the disc. Thus, the tracking servo on the servo surface cannot allow accurate scanning on an intended track of the data layer. Accordingly, it is desirable for the grooveless optical disc to use a recorded mark in the data layer for tracking servo.

However, some statuses of the recording mark might prevent the tracking servo using a PP-TES or a DPD-TES.

FIG. 3 is a graph showing a relationship between a mark width and a PP-TES amplitude in an optical system set forth in Patent Document 1. The mark width is normalized based on a track pitch of 0.32 micrometers. The PP-TES amplitude decreases both in small and large recording mark widths. At some mark widths, the PP-TES amplitude falls below a lower limit value of the PP-TES which is determined based on the performance of a tracking servo circuit of an optical disc device, so that accurate tracking servo cannot be performed. Thus, in order to perform the tracking servo by using the recording mark, the width of the recording mark needs to be adjusted to an appropriate width.

The same holds true for performing the tracking servo by using the DPD method. FIGS. 4A to 4C are graphs showing relationships of a recording mark width normalized based on a track pitch with a DPD-TES and signals related to DPD-TES generation. As in FIG. 3, the reproduction condition is based on Patent Document 1. In FIG. 4A, the vertical axis represents an amplitude of the (A+C) input signal S211 or the (B+D) input signal S212 (hereinafter, each referred to as a DPD input signal) in the DPD-TES generation circuit in FIG. 2A. In FIG. 4B, the vertical axis represents an amplitude of the DPD-TES. In FIG. 4C, the vertical axis represents a relative time difference of the DPD-TES (hereinafter, referred to as a DPD relative time difference), which is a value obtained by normalizing a pulse-width integrated value of the leading phase pulse signal S231 or the lagging phase pulse signal S232, which are obtained in the DPD-TES generation circuit in FIG. 2A when a track is scanned by a predetermined track offset amount, by using the number of mark edges and a channel bit frequency. In FIG. 2C, the track offset amount is 0.050 micrometers. The DPD input signal amplitude, the DPD-TES amplitude, and the DPD relative time difference also vary largely depending on the mark widths. At large and small mark widths, these values fall below their respective lower limit values for performing the tracking servo by using the DPD-TES, so that accurate tracking servo cannot be performed. Thus, in a case where the tracking servo is performed by using the DPD method, the width of the recording mark needs to be also adjusted to an appropriate width.

Judging from the above, some recording mark statuses prevent implementation of the tracking servo using a PP-TES or a DPD-TES obtained from the recording mark.

The examples in FIG. 3 and FIGS. 4A to 4C have horizontal axes representing normalized mark widths and show variations of the PP-TES and the DPD-TES. However, actually, even though the mark width is fixed, the PP-TES and the DPD-TES vary depending on an absolute value of a recording power, a recording waveform, an edge shape of the recording mark, and the like. Thus, parameters included in the aforementioned recording mark status include not only the mark width but also the recording power, the recording waveform, the edge shape of the recording mark, and the like.

The aforementioned problem is solved by performing recording using a recording condition under which a TES quality obtained from marks of a recording signal is equal to or higher than a lower limit value of the TES quality enabling the tracking servo.

For example, trial writing signals are written under multiple recording conditions, and then the trial writing signals are reproduced to determine a recommended recording condition under which favorable qualities of a reproducing signal and a TES can be obtained. Thereafter, recording is performed by using the recommended recording condition. This provides the recording signal with the favorable reproducing signal quality and enables the tracking servo by using the recording signal.

In addition, for example, when the recommended recording condition providing the favorable reproducing signal and TES qualities and/or information on the recommended recording condition are stored in management information of an optical disc, the recording power is adjusted based on the management information before the recording to obtain the recommended recording condition. By performing the recording using the obtained recommended recording condition, a reproducing signal and a TES of favorable qualities are be acquired from the recording signal, and the tracking servo using the recording signal can be performed.

According to the recording adjusting method of the present invention, tracking servo can be implemented by using a recording signal.

An object, a configuration, and an effect other than the above will become apparent in the following description of embodiments.

BRIEF DESCRIPTION OF THE DRAWINGS

FIGS. 11A and 11B are exemplary views of a management information region of an optical disc.

DESCRIPTION OF THE PREFERRED EMBODIMENTS

Hereinbelow, embodiments of the present invention will be described with reference to the drawings.

First Embodiment

A first embodiment shows an example in which tracking servo using a recording signal can be implemented by predetermining a recommended recording condition for acquiring an appropriate TES from a recording signal and by performing recording by use of the recommended recording condition.

Figure 5:
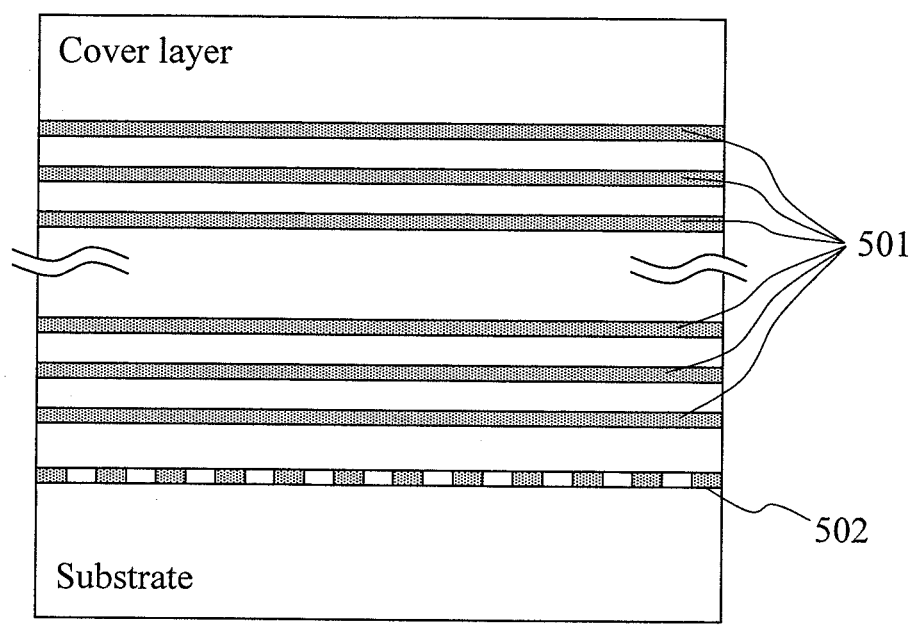
FIG. 5 is an exemplary view of a structure of a grooveless optical disc in which a servo surface exists farther, viewed from a light incidence side.

A grooveless disc shown in a schematic cross-sectional view of FIG. 5 is used as the optical disc. Multiple data layers 501 have a grooveless structure. A single servo surface 502 including a groove of a spiral structure is provided farther from a light incidence side. Note that the servo surface 502 is provided to scan light spots in a spiral manner at the time of recording. As long as the optical disc has a structure allowing implementation of this function, the position, the number, and the like of the servo surface are not limited to those in FIG. 5.

Figure 6:
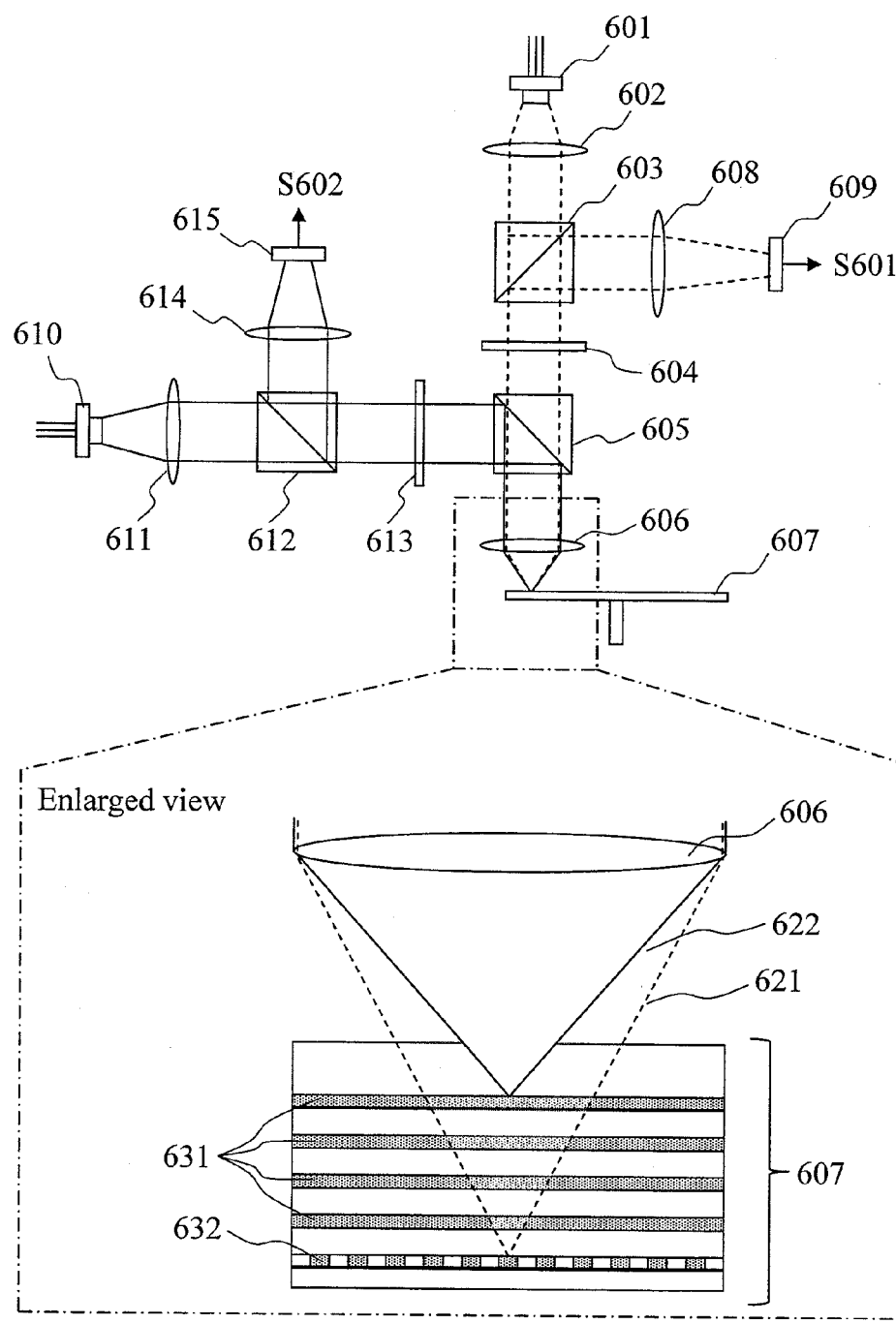
FIG. 6 is an exemplary configuration view of a principal part of an optical pickup for performing recording and reproduction on the grooveless optical disc with a servo surface.

FIG. 6 shows an exemplary configuration view of an optical pickup for performing recording and reproduction on the grooveless disc. The pickup uses a red LD 601 having a wavelength of 650 nm as laser for exclusive tracking servo use. Red light emitted from the red LD 601 turns into parallel light through a collimating lens 602, passes through a polarization beam splitter (hereinafter, PBS) 603, and turns into circularly polarized light through a quarter wave plate 604. The red light passing through the quarter wave plate 604 also passes through a dichroic mirror 605, because the dichroic mirror 605 is designed to transmit light of a red wavelength and reflect light of a blue wavelength. The red light is condensed on a servo surface 632 of an optical disc 607 by an object lens 606.

An enlarged view in FIG. 6 schematically shows a state in which red light 621 is condensed on the servo surface 632 of the optical disc 607. The red light 621 reflected from the servo surface 632 again passes through the object lens 606 and thereby turns into parallel light. After passing through the dichroic mirror 605, the red light 621 is changed into linearly polarized light by the quarter wave plate 604, the linearly polarized light being orthogonal to the red light immediately after being emitted from the red LD 601. Thereby, the red light 621 is reflected by the PBS 603 and then is condensed on a photo detector 609 by a condensing lens 608. Since the photo detector 609 is divided so that a TES can be generated, various computing is performed on a signal S601 generated from the red light 621, whereby a TES is generated. The object lens 606 is controlled based on the generated TES, and thereby tracking servo is always performed on a spot of the red light 621 on the servo surface 632.

In contrast, a blue LD 610 having a wavelength of 405 nm is used as laser for recording and reproduction and recording mark servo. Blue light emitted from the blue LD 610 turns into parallel light through a collimating lens 611, passes through a PBS 612, and turns into circularly polarized light through a quarter wave plate 613. The blue light of the circularly polarized light is reflected by the dichroic mirror 605 and is condensed on a data layer 631 of the optical disc 607 by the object lens 606. Note that since the red light 621 and blue light 622 share the object lens 606 in the tracking servo with the red light 621, movement of a spot of the blue light 622 is synchronized with movement of the object lens 606 in the tracking servo. In other words, the spot of the blue light 622 is synchronized with the groove of the servo surface 632, which enables positioning in an in-plane direction on the grooveless data layer 631.

The blue light 622 reflected from the data layer 631 again passes through the object lens 606 and thereby turns into parallel light. After being reflected by the dichroic mirror 605, the blue light 622 is changed into linearly polarized light by the quarter wave plate 613, the linearly polarized light being orthogonal to the blue light immediately after being emitted from the blue LD 610. Thereby, the blue light 622 is reflected by the PBS 612 and then is condensed on a photo detector 615 by a condensing lens 614. The photo detector 615 has a structure in which an RF signal and a TES can be generated. Various computing is performed on a signal S602 generated from the blue light 622, whereby an RF signal and a TES are generated. The blue light from the blue LD 610 is used mainly for recording and reproduction. If the blue light is used for the tracking servo, however, the object lens 606 is controlled by a TES generated from a signal S602 from the blue light 622.

Figure 7:
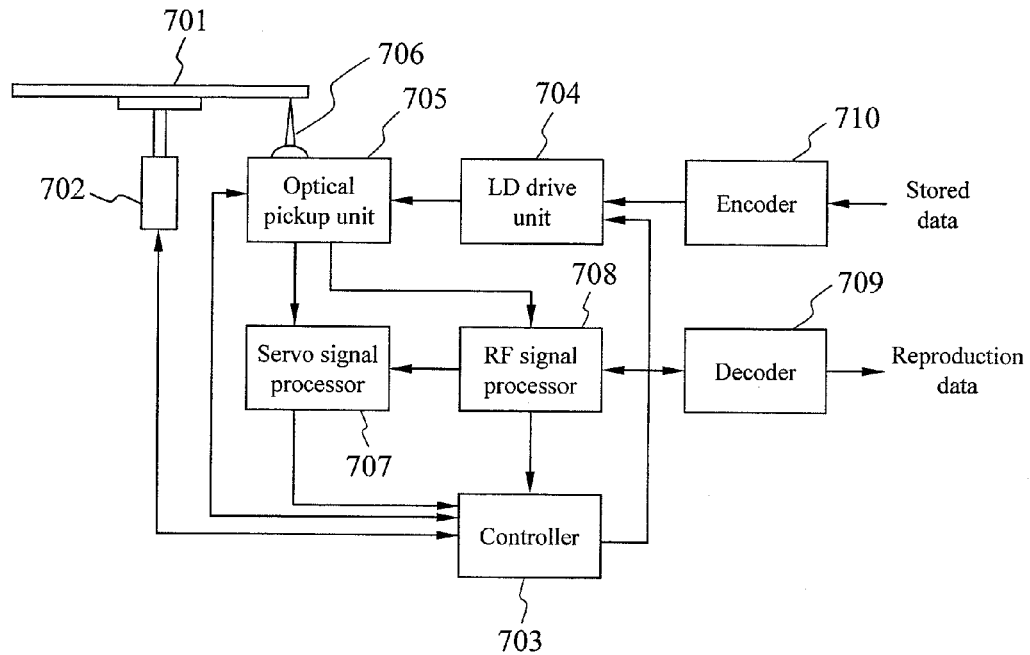
FIG. 7 is an exemplary block diagram of an optical disc device.

FIG. 7 shows a block diagram of an optical disc device including the optical pickup having the aforementioned configuration. A description is given below of a method for recording and reproducing information in and from a grooveless disc with reference to the block diagram. An optical disc 701 is rotated by a spindle motor 702 and subjected to constant linear velocity (CLV) control or constant angular velocity (CAV) control on the basis of a signal from a controller 703.

In performing reproduction on the optical disc 701, a LD drive unit 704 supplies an optical pickup unit 705 with a current for driving a LD to be used for the reproduction, on the basis of a signal from the controller 703, and the LD in the optical pickup unit 705 emits laser light 706. Specifically, the red light 621 and the blue light 622 in FIG. 6 are emitted to the optical disc 607 by a reproducing power. At this time, the optical pickup unit 705 supplies a signal to a servo signal processor 707 and performs focus servo and tracking servo in response to a focus error signal and a TES which are generated by the controller 703 based on a signal from the servo signal processor 707. Although the focus servo can be performed based on any of the red light and the blue light, the focus servo is performed, in this embodiment, based on the blue light condensed on the data layer. In contrast, the tracking servo in reproduction is performed either on a servo surface using the red light or a recording mark using the blue light. A reproduction signal acquired from the blue light under the focus servo and the tracking servo turns into reproduction data by being supplied to an RF signal processor 708 including an RF amplifier, an equalizer, a binarizing unit, a PLL unit, and the like and then by being decoded by a decoder 709. The RF signal processor 708 supplies a reproduction signal level, a wobble signal, a decoding signal, and the like to the servo signal processor 707 and the controller 703.

In performing recording on the optical disc 701, the red light emitted from the optical pickup unit 705 is emitted to a servo surface by the reproducing power, and the tracking servo is performed based on the red light. In contrast, the blue light is controlled by the LD driving current supplied by the LD drive unit 704 based on a signal supplied from an encoder 710 according to recording data and based on the signal supplied from the controller 703. Thereby, a signal according to the recording data is recorded in the data layer of the optical disc 701.

Figure 8:
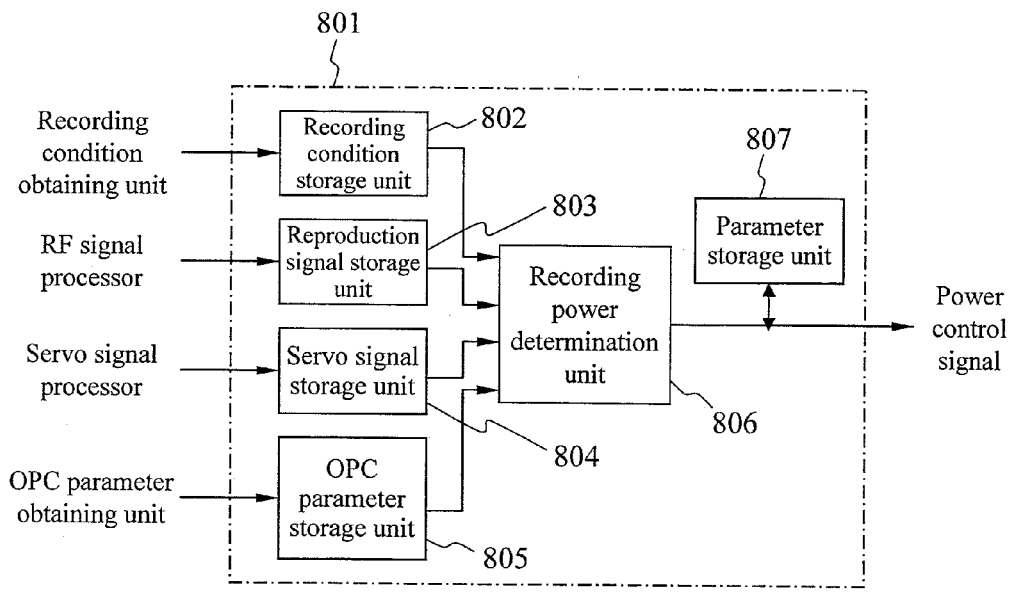
FIG. 8 is an exemplary block diagram of a controller of the optical disc device.

Meanwhile, before recording, the optical disc device might perform optimum power control (OPC) to adjust an optimum recording power. The OPC is performed by the controller 703. FIG. 8 shows a block diagram for implementing the function. In a recording power adjustment unit 801 in the controller 703, a recording power determination unit 806 determines the optimum recording power based on information supplied from a recording condition storage unit 802, a reproduction signal storage unit 803, a servo signal storage unit 804, and an OPC parameter storage unit 805. Then, the recording power determination unit 806 outputs a power control signal indicating the optimum recording power. At this time, the parameter storage unit 807 stores the determined optimum recording power, recording conditions, and the like.

The recording condition storage unit 802 stores information related to recording conditions, such as a recording rate, a recording position, a recording waveform, and the like. The reproduction signal storage unit 803 stores reproduction signal qualities, levels, and the like provided from the RF signal processor 708, the reproduction signal qualities including a bit error rate (bER), a maximum likelihood sequence error (MLSE), an integrated-maximum likelihood sequence error (i-MLSE, see US 2003/0067998, if necessary), a run-length-limited sequence error for adaptive target (L-SEAT, see Patent Document 1), a jitter, and the like. The servo signal storage unit 804 stores a PP-TES amplitude, a DPD-TES amplitude, a DPD input signal amplitude, a DPD relative time difference, and the like which are provided from the servo signal processor 707. The OPC parameter storage unit 805 stores: medium-specific OPC parameters kappa, pi, beta, epsilon, Pind, and mind which are obtained from the optical disc management information; desired values of a PP-TES amplitude, a DPD-TES amplitude, a DPD input signal amplitude, and a DPD relative time difference; and the like.

Examples of a method of implementing OPC using the function shown in FIG. 8 includes a kappa method, as described in Patent Document 1, which uses a relationship between a recording power Pw and a modulation degree m. In the kappa method, trial writing is firstly performed in a trial writing region of an optical disc by using various recording powers Pw, and trial writing signals are reproduced to obtain modulation degrees m(Pw). Then, linear approximation is performed on a relationship between each recording power Pw and the recording power Pw×the modulation degree thereof m(Pw) near the recording power Pw, so that a Pw value by which kappa×Pth(Pw)=Pw holds true is determined by using kappa and Pth(Pw). Pth(Pw) is a Pw section of the approximation line, and kappa is an OPC parameter. Lastly, the determined Pw value is multiplied by pai which is an OPC parameter, and a value thus obtained is determined as the optimum recording power. As described above, the kappa method is an OPC method in which the optimum recording power can be easily determined by simply performing trial writing and computation in accordance with designated procedures. Note that the determination of the trial writing condition in the trial writing in the OPC uses information provided by the OPC parameter storage unit 805 and the recording condition storage unit 802, and thus uses the recording power determination unit 806 as well.

Figure 3:
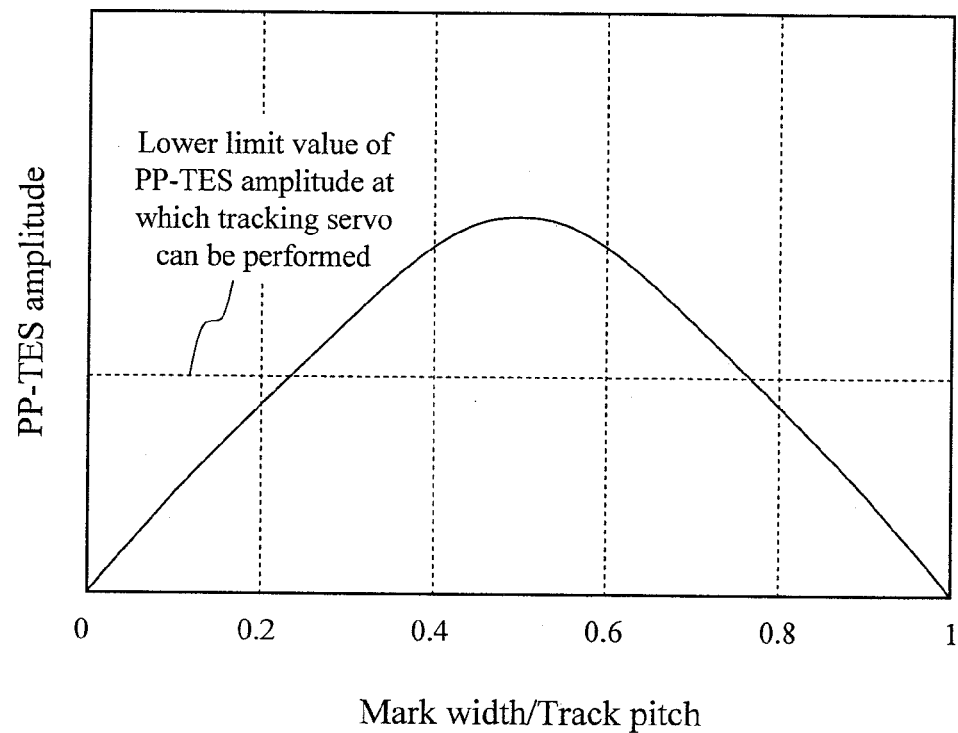
FIG. 3 is an exemplary graph showing a relationship between a recording mark width and a PP-TES amplitude.
Figure 4A:
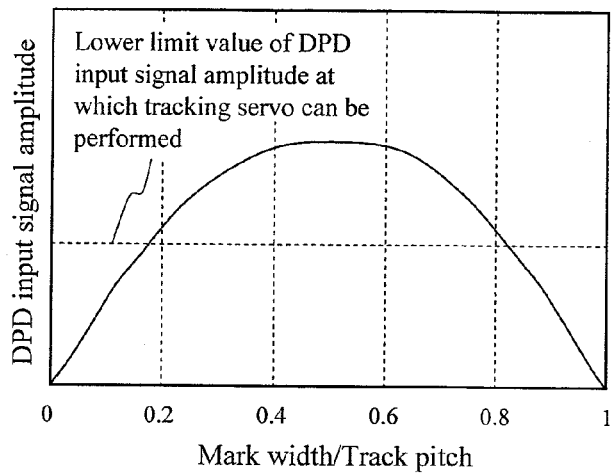
FIGS. 4A to 4C are exemplary graphs showing relationships of the recording mark width with a DPD input signal amplitude, a DPD-TES amplitude, and a DPD relative time difference.
Figure 4B:
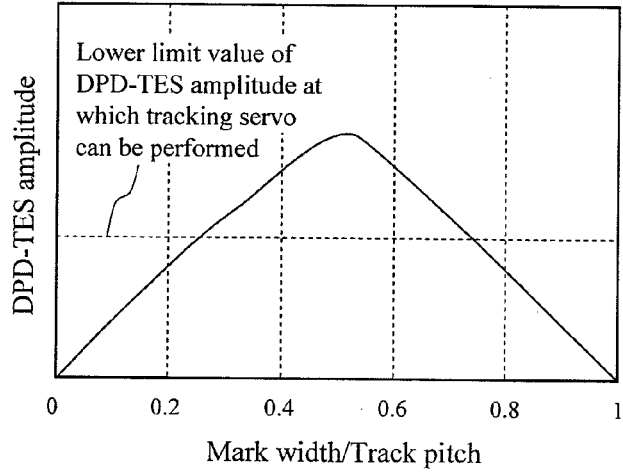
Figure 4C:
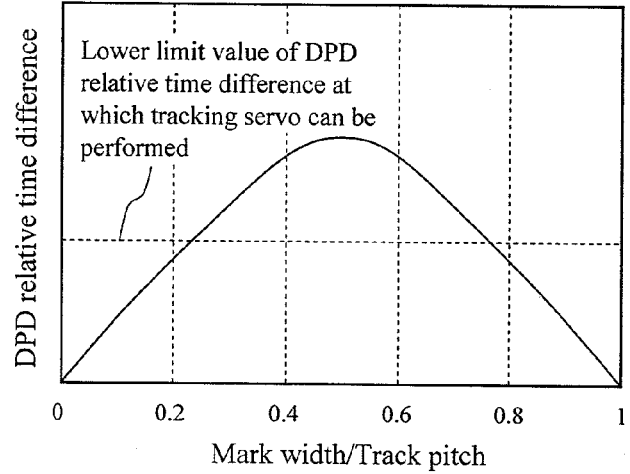
Figure 9:
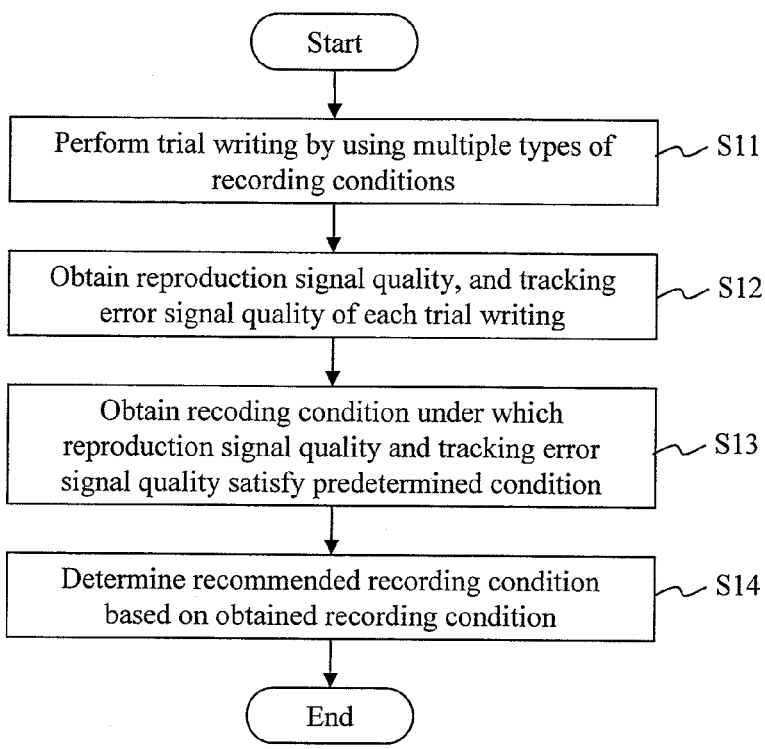
FIG. 9 is an exemplary flowchart of a recommended recording condition determination method of the present invention.

Hereinbelow, a description is given of a recommended recording condition determination method for a grooveless disc by using the aforementioned optical disc device. The grooveless disc has limited recording conditions for obtaining a favorable TES, as shown in FIGS. 3 to 4C. This means that the recommended recording condition for the grooveless disc must satisfy requirements of a favorable recording signal quality and a favorable TES acquired from a mark of a recording signal. Hence, the recommended recording condition is determined in accordance with a flowchart in FIG. 9.

Figure 10:
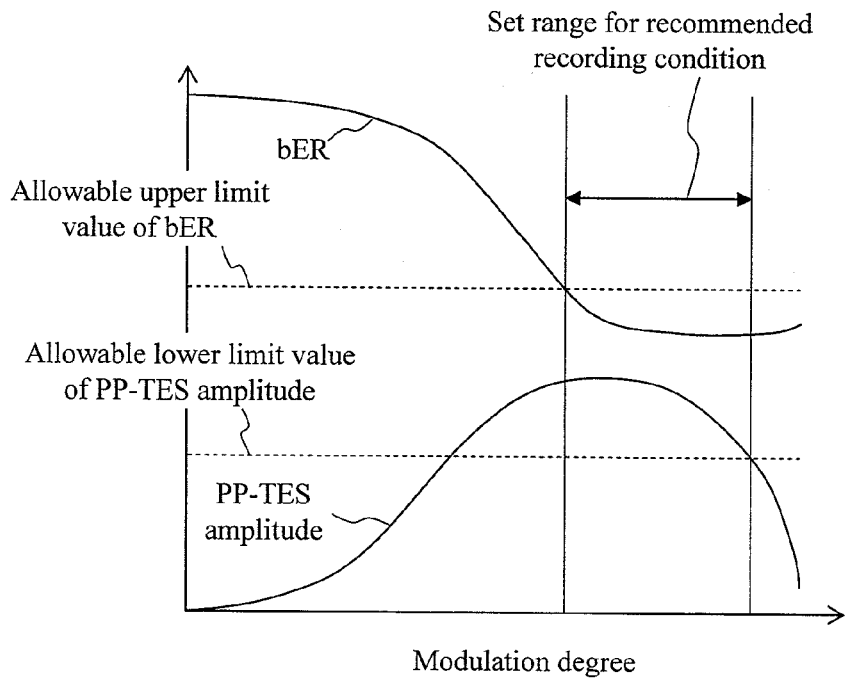
FIG. 10 is an exemplary graph of relationships of a desired modulation degree used for recording adjustment with a PP-TES amplitude and a bER.

Firstly, in Step S11, trial writing of a random pattern is performed on consecutive five tracks under various recording conditions (recording powers and recording waveforms). Next, a reproduction signal quality is obtained by reproducing information on the center track under each recording condition. A PP-TES amplitude generated at a track jump from the center track to a track adjacent thereto is measured to obtain a quality of the TES (S12). A modulation degree is also obtained from the signal from the center track under the recording condition. From the recording conditions having the same modulation degree, a recording condition having the lowest bER is selected. FIG. 10 shows a graph of a result of plotting relationships of the modulation degree of the recording condition with a bER and a PP-TES amplitude. This corresponds to a result of plotting a bER and a PP-TES in recording under a recording condition adjusted to have the lowest bER relative to each desired modulation degree. Dotted lines in FIG. 10 represent an allowable upper limit value of the bER and allowable lower limit value of the PP-TES amplitude. The values are determined based on the performance of the optical disc device in this embodiment; however, conditions such as standards may be applied to the determination.

In FIG. 10, a recording condition under which both the bER and PP-TES satisfy the allowable values is determined as a set range, shown in FIG. 10, for the recommended recording condition (S13). The recommended recording condition may be determined within this range. For example, the center of the set range may be determined as the recommended recording condition so that the largest margin of the recording condition can be set. Alternatively, for example, a recording condition having the lowest bER in the set range may be determined as the recommended recording condition so that the best reproduction signal quality can be obtained. Still alternatively, for example, a recording condition having the highest PP-TES amplitude in the set range may be determined as the recommended recording condition so that the tracking servo can be ensured (S14). The recommended recording condition is determined in the aforementioned manner, and recording is performed on a data layer of the disc by using the determined recommended recording condition. Thereby, a favorable TES can be acquired from a recording signal at the time of reproduction, so that the tracking servo can be performed.

Although a bER is used as an indicator of the signal quality in the aforementioned method, a jitter may be used as the indicator of the signal quality if a reproduction signal amplitude can be obtained even in the shortest recording signal duration. Also in this case, the recommended recording condition can be determined as in the case described above, and the tracking servo can be performed on the recording signal at the time of reproduction. In a case of a signal having a reproduction signal amplitude of almost zero in the shortest recording signal duration, MLSE, i-MLSE, and L-SEAT described in Patent Document 1 may be used as the signal quality indicator. Thereby, the recommended recording condition can be determined as in the case described above.

In the aforementioned method, a PP-TES amplitude is used as an indicator of the TES quality. However, if the tracking servo in reproduction is performed by the DPD method, a DPD-TES amplitude, a DPD input signal amplitude, and a DPD relative time difference may be used. Thereby, the recommended recording condition can be determined as in the case described above, and the tracking servo can be performed on the recording signal at the time of reproduction. In addition, to ensure both the PP method and the DPD method for the tracking servo at the time of reproduction, both the PP-TES amplitude and the DPD-TES amplitude as well as the DPD input signal amplitude or the DPD relative time difference are used to determine the recommended recording condition within conditions under which these and the reproduction signal quality satisfy allowable values thereof. Thereby, the tracking servo can be performed on a signal recorded under the recommended recording condition, by any one of the PP method and the DPD method.

In the above description, the PP-TES amplitude, the DPD-TES amplitude, the DPD input signal amplitude, and the DPD relative time difference are used as indicators of the TES quality. However, in addition to these indicators, performing the tracking servo stably requires checking of an amount of TES fluctuation, linearity near the center of the track, and an amount of shift (asymmetry) between the amplitude center and the track center. The linearity of a TES is obtained by evaluating the linearity of relationships of the detrack amount from the track center with the PP-TES amplitude and the DPD relative time difference. The amount of TES fluctuation is obtained as a standard deviation of a PP-TES amplitude amount and the DPD relative time difference in each detrack amount. The asymmetry is obtained in the following manner. Specifically, detracking is performed by using a value of plus and minus ¼ of the track from the center therefrom, and a difference between absolute values of DPD relative time differences at the detracking is divided by a sum of the absolute values. Also in a case where these parameters are added to the indicators of the TES quality, the recommended recording condition can be determined in the same manner as described above. Thereby, the TES quality obtained from the recording signal can be enhanced, and thus the tracking servo using a highly accurate recording signal can be performed at the time of reproduction.

In the aforementioned method, the range of the recommended recording condition determination is obtained with the horizontal axis in FIG. 10 representing the modulation degree. However, with the horizontal axis representing the recording power at measurement points, the recommended recording condition determination can also be made as in the case of the modulation degree. When the recording waveform is fixed with the horizontal axis representing the recording power, the set range, for the recommended recording condition, in the recording waveform can be determined, which enables the recommended recording condition determination within the set range. Similarly, when the recording power is fixed with the horizontal axis representing the recording waveform, the recommended recording condition in the recording power can be determined. The signal quality indicator, the TES quality indicator, and the parameter on the horizontal axis may be selected based on constraint conditions in determining the recommended recording condition. In particular, in the absence of the constraint condition, application of the reproduction signal quality or the TES quality to the horizontal axis leads to easier determination of the recommended recording condition. In the method described above, the set range of the recommended recording condition is determined, and thereby the recommended recording condition is determined within the set range. Alternatively, any recording condition having the indicators of the signal quality and TES quality in a tolerance may be selected and determined as the recommended recording condition. This can also provide the same effect.

In the aforementioned method, the method using a track jump has been described as a method of measuring the TES quality. In another method, the TES quality of the recording signal may be measured at a spot of blue light emitted to a data layer while detracking, by a certain amount, a spot of red light under tracking servo in reproducing a recording signal. When the measurement is made by this method, the tolerance of the TES quality varies in accordance with the detrack amount, but the resultant recommended recording condition is the same as that described above. The TES quality measurement method is applicable to a TES quality measurement method in the following embodiments.

In the aforementioned method, a random pattern is recorded in the consecutive five tracks. As long as signals under the same recording condition are recorded in at least two adjacent tracks, the reproduction signal quality and the TES quality can be obtained. In the recording, all of the signals recorded in the two tracks are not required to be recorded under the same recording condition. As long as any adjacent signals are recorded under the same recording condition, signals may be recorded in each track under multiple recording conditions. This can reduce a region used for the trial writing.

Figure 1A:
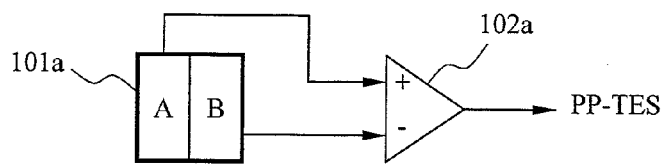
FIGS. 1A to 1C are exemplary views of a generation principle of a PP-TES used for tracking servo using a PP method.
Figures 1, 1B:
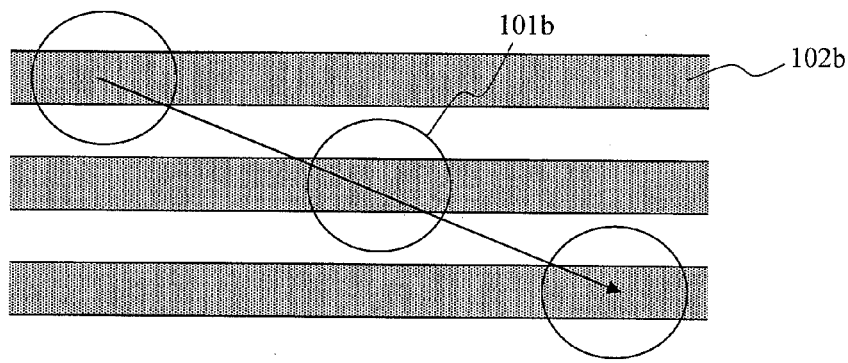
Figures 1, 1B, 2:
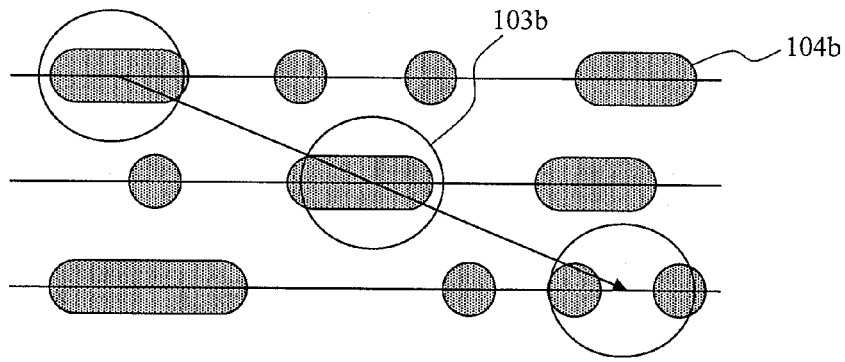
Figure 1C:
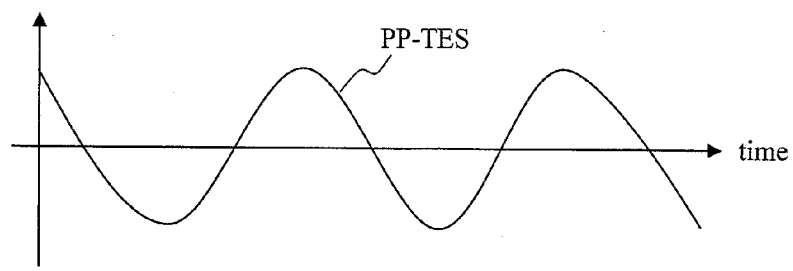
Figure 2A:
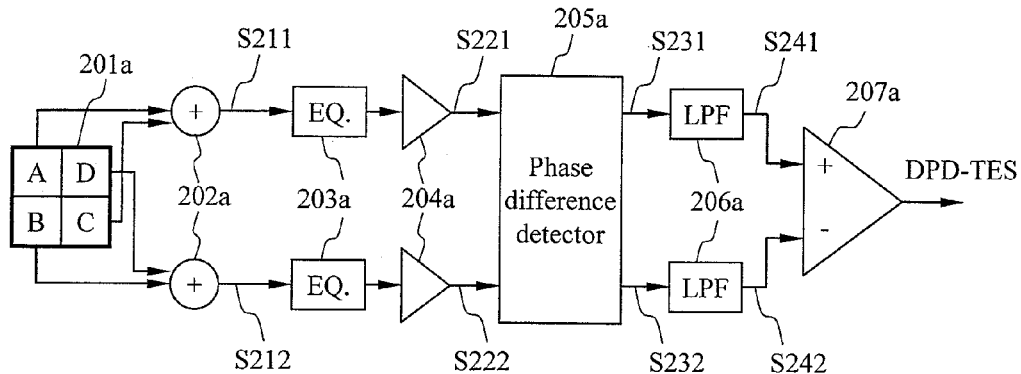
FIGS. 2A to 2F are exemplary views of a generation principle of a DPD-TES used for tracking servo using a DPD method.
Figure 2B:
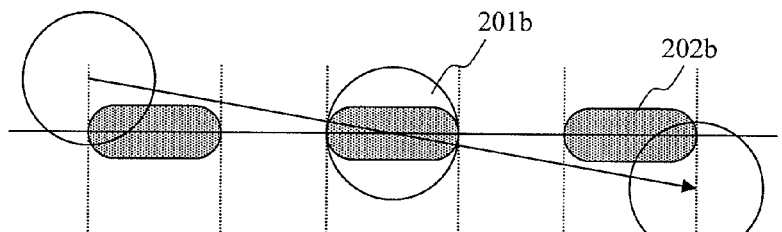
Figure 2C:
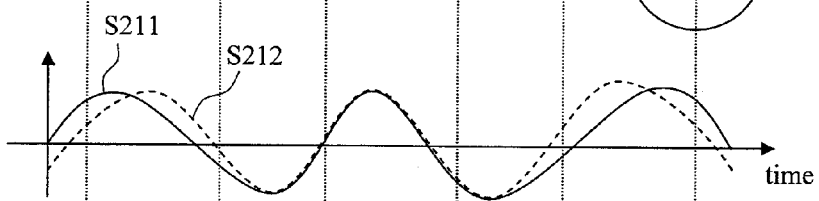
Figure 2D:
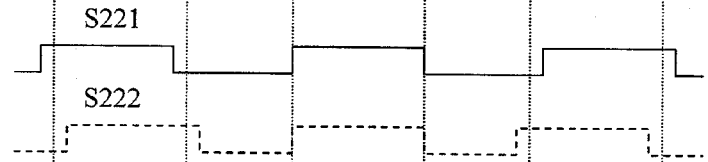
Figure 2E:
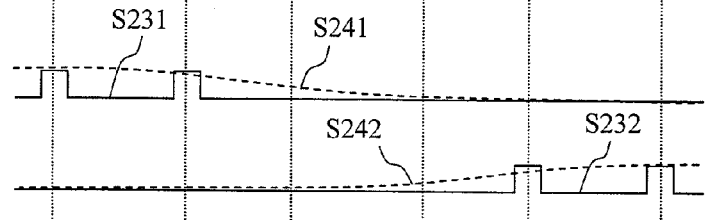
Figure 2F:
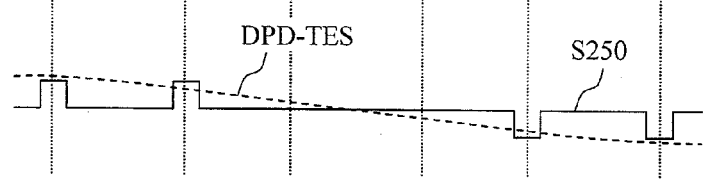

Meanwhile, suppose a case where the PP-TES amplitude in the aforementioned method is defined as a sum of absolute values obtained in the following manner. Specifically, detracking is performed by using a value of plus and minus ¼ of the track from the center thereof, and each of resultant PP-TESes is divided by a sum level ((A+B) signal in the photo detector 101a in FIG. 1A). In this case, an allowable value of the PP-TES amplitude may be a PP-TES amplitude not less than 0.10 and not greater than 0.35. In addition, a fluctuation amount of the PP-TES amplitude may be defined as a value obtained by dividing a difference between a maximum value and a minimum value of the PP-TES amplitude by a sum of the maximum value and the minimum value. A tolerance of the fluctuation amount may be 0.25 or lower.

The DPD relative time difference in the aforementioned method may be defined as a value obtained at the time of 50 nm detracking from the track center. A tolerance thereof may be set to a DPD relative time difference not less than 0.28 and not greater than 0.62. The shift amount (asymmetry) of the amplitude center of the DPD relative time difference may be obtained in the following manner. Specifically, detracking is performed by using a value of plus and minus ¼ of the track from the center therefrom, and a difference between absolute values of DPD relative time differences at the time of the detracking is divided by a sum of the absolute values. A tolerance thereof may be 0.20 or lower.

Meanwhile, if the determined recommended recording condition is stored in the disc as a parameter specific to the medium, recording condition optimization among optical disc devices can be performed easily. FIG. 11A is a schematic view showing management information 1002 of a grooveless disc 1001. The management information 1002 includes disc information (DI) 1003, defect management information 1004, a trial writing region 1005, and the like. FIG. 11B is an exemplary table of information included in the DI 1003. For example, it is advisable that the recommended recording condition be stored in write strategy information and an OPC parameter in the DI 1003. Here, the recommended recording condition is stored as information from which the recommended recording condition can be restored in each of the optical disc devices. For example, OPC parameters (PIND, mIND, pai, epsilon BW, epsilon C, epsilon S, kappa, beta and desired TES quality value) used in the kappa method may be calculated based on the relationship between the recording power and the modulation degree in the recording waveform of the recommended recording condition, and then be stored in the DI 1003. Performing the OPC using the kappa method based on the OPC parameters at the time of recording makes it possible for the optical disc devices to obtain the recommended recording condition and to achieve recording in which the tracking servo can be implemented using recording signals.

Second Embodiment

This embodiment describes a case of changing the recommended recording condition determination method in the first embodiment. Since unchanged part of the method is the same as in the first embodiment, a detailed description thereof will be omitted.

Figure 12:
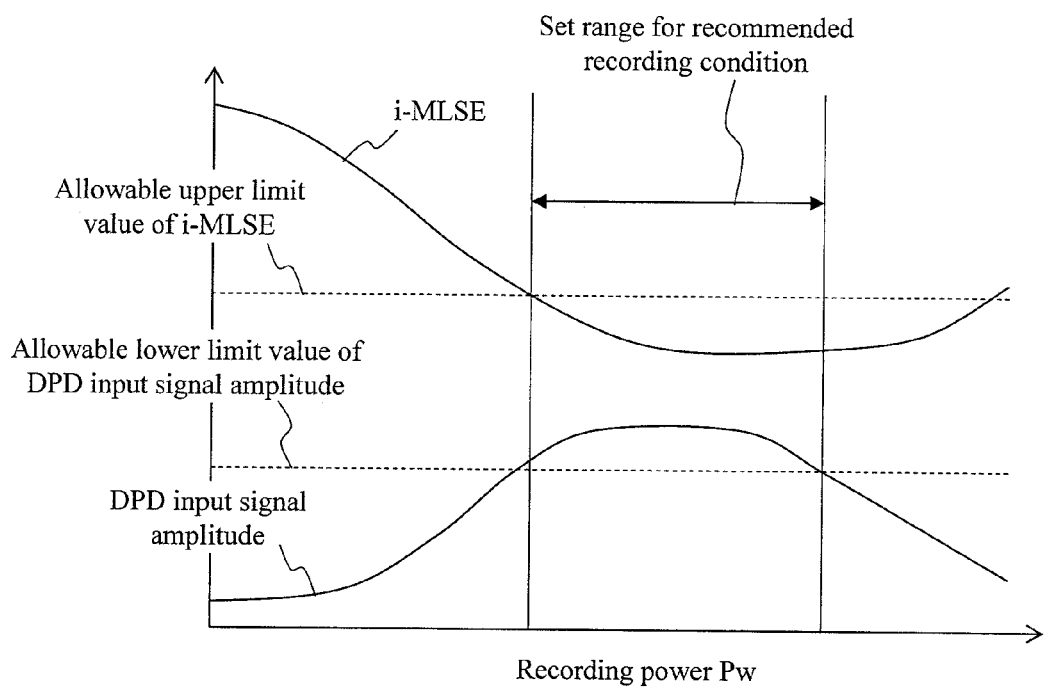
FIG. 12 is an exemplary graph showing relationships of a recording power Pw used for recording adjustment with a DPD input signal amplitude and i-MLSE.

A recommended recording condition may be determined in the following manner. For example, a recording waveform having the lowest bER in various recording powers is determined, and then relationships of the recording power having the recording waveform with i-MLS and a DPD input signal amplitude are used to determine the recommended recording conditions. FIG. 12 shows the relationships. It is seen from FIG. 12 that a region having i-MLSE equal to or lower than an allowable upper limit value and having the DPD input signal amplitude equal to or higher than an allowable lower limit value is a region indicated by the arrow and that the recommended recording condition may be determined within this range. By performing recording using the recommended recording condition determined in this set range, the tracking servo using the recording signal is implemented at the time of reproduction.

In this embodiment, the recording power is used for the horizontal axis in FIG. 12. However, also in a case where the modulation degree of the recording signal is used for the horizontal axis, the recommended recording condition can be determined as in the case of the recording power.

Third Embodiment

This embodiment describes a case of changing the recommended recording condition determination method in the first embodiment. Since unchanged part of the method is the same as in the first and second embodiments, a detailed description thereof will be omitted.

Figure 13:
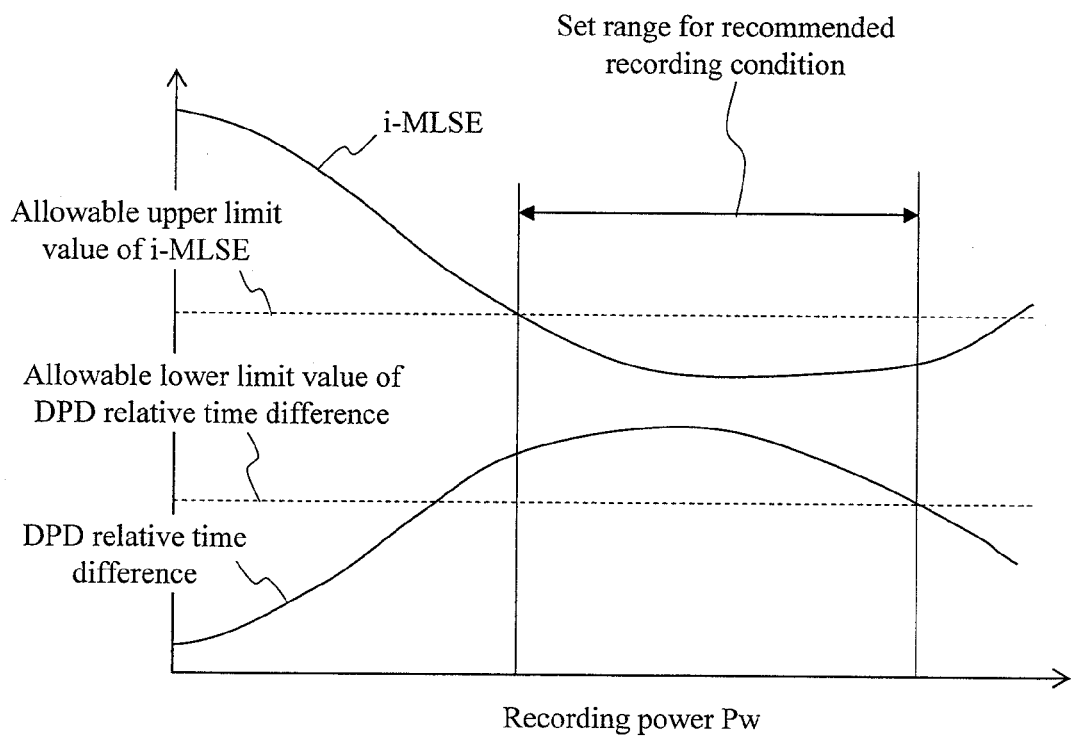
FIG. 13 is an exemplary graph showing relationships of a recording power Pw used for recording adjustment with a DPD relative time difference and i-MLSE.

A recommended recording condition may be determined in the following manner. For example, a recording waveform having the lowest bER in various recording powers is determined, and then relationships of the recording power having the recording waveform with i-MLS and a DPD relative time difference are used to determine the recommended recording conditions. FIG. 13 shows the relationships. It is seen from FIG. 13 that a region having i-MLSE equal to or lower than an allowable upper limit value and having the DPD relative time difference equal to or higher than an allowable lower limit value is a region indicated by the arrow and that the recommended recording condition may be determined within this range. By performing recording using the recommended recording condition determined in this set range, the tracking servo using the recording signal is implemented at the time of reproduction.

In this embodiment, the recording power is used for the horizontal axis in FIG. 13. However, also in a case where the modulation degree of the recording signal is used for the horizontal axis, the recommended recording condition can be determined as in the case of the recording power. In addition, the DPD relative time difference is used as an indicator of the TES quality. However, use of a DPD-TES amplitude also results in the same relationships as in FIG. 13, because the DPD-TES amplitude is proportional to the DPD relative time difference. Thereby, the recommended recording condition can be determined.

Fourth Embodiment

This embodiment describes a case of changing the optical disc in the first embodiment. Since unchanged part of the method is the same as in the first to third embodiments, a detailed description thereof will be omitted.

In this embodiment, pits or recording marks are formed in a spiral structure in the servo surface 502 in the optical disc in FIG. 5. The optical disc device (FIG. 7) performs tracking servo on the optical disc by using the red light. At this time, the tracking servo is performed by the DPD method. The recommended recording condition for the data layer 501 of the optical disc is determined by exactly the same method as in the first embodiment. By recording information in data layers by using the determined recommended recording condition, the tracking servo can be performed on recording signals.

Fifth Embodiment

This embodiment describes a case of changing the optical disc in the first embodiment. Since unchanged part of the method is the same as in the first to third embodiments, a detailed description thereof will be omitted.

Figure 14:
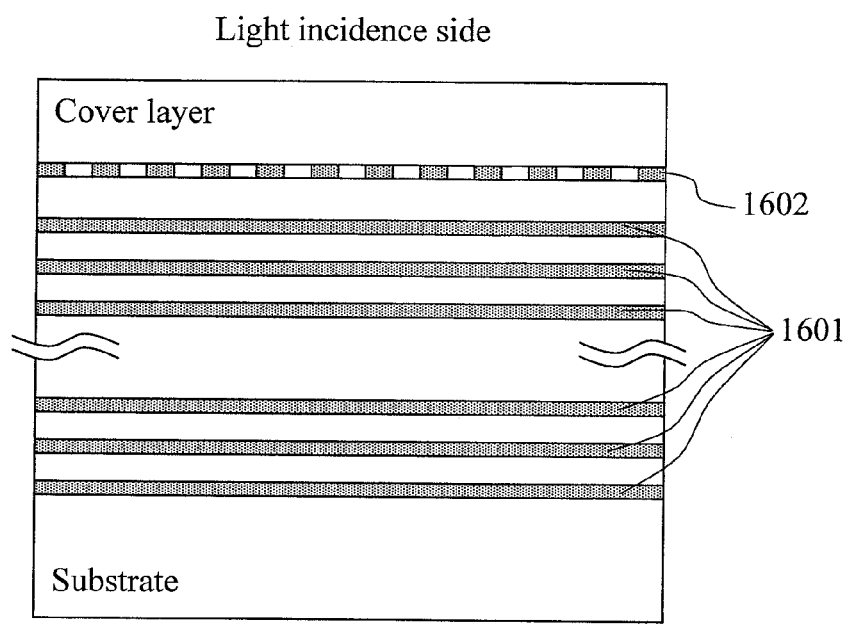
FIG. 14 is an exemplary view of a structure of a grooveless optical disc in which a servo surface exists closer, viewed from the light incidence side.

This embodiment uses an optical disc whose cross section is shown in FIG. 14. A servo surface 1602 of the optical disc is located on the light incidence side and has a groove for tracking servo. The groove has a single spiral structure having alternate groups of lands and grooves, like a DVD-RAM. Grooveless data layers 1601 are arranged on the substrate side farther from the light incidence side than the servo surface 1602.

The optical disc device (FIG. 7) performs the tracking servo on this optical disc by using the red light. At this time, the tracking servo is performed by the PP method. The recommended recording condition for the data layers 1601 of the optical disc is determined by the same method as in the first embodiment. By recording information in the data layers by using the determined recommended recording condition, the tracking servo can be performed on recording signals.

Sixth Embodiment

This embodiment describes a case of changing the optical disc in the first embodiment. Since unchanged part of the method is the same as in the first to third embodiments, a detailed description thereof will be omitted.

Figure 15:
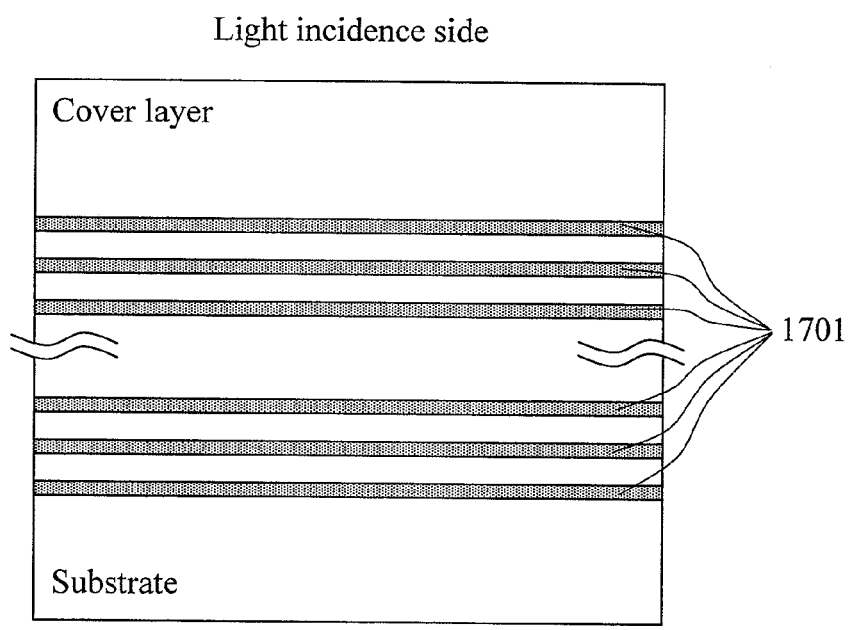
FIG. 15 is an exemplary view of a structure of a grooveless optical disc without a servo surface.

This embodiment uses an optical disc whose cross section is schematically shown in FIG. 15. The optical disc does not include a servo surface but includes grooveless data layers 1701 only. Several tracks include pits or recording marks which are already present in recording start portions of the data layers.

Figure 16:
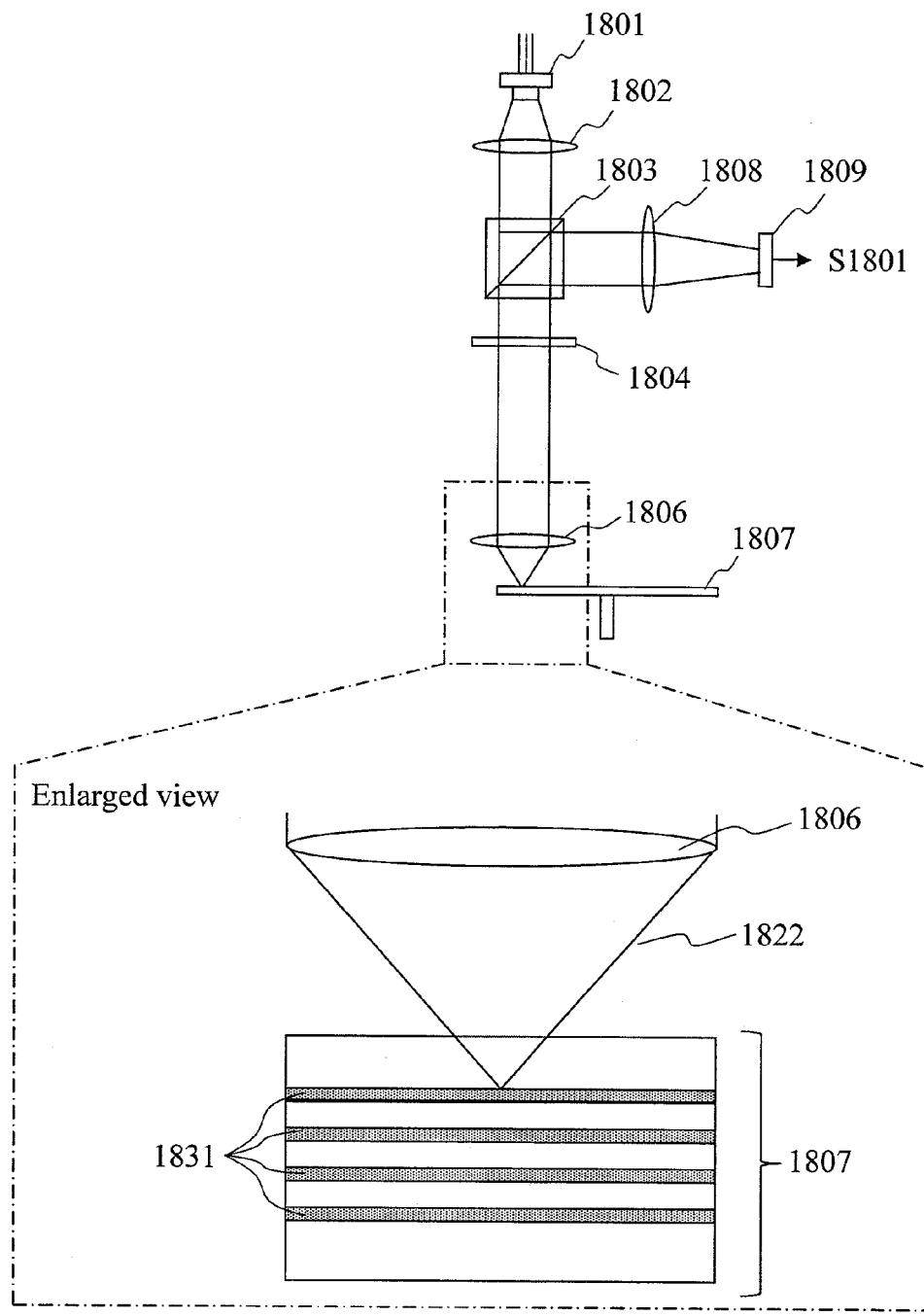
FIG. 16 is an exemplary configuration view of a principal part of an optical pickup for recording and reproduction on the grooveless optical disc without the servo surface.

FIG. 16 is an exemplary schematic configuration view of an optical pickup used for recording and reproduction on the optical disc. The pickup uses almost the same optical system as that used for BD recording and reproduction. A blue LD 1801 having a wavelength of 405 nm is used as laser used for recording and reproduction and recording mark servo. Blue light emitted from the blue LD 1801 turns into parallel light through a collimating lens 1802, passes through a PBS 1803, and turns into circularly polarized light through a quarter wave plate 1804. The blue light which has turned into the circularly polarized light is condensed on one of data layers 1831 of an optical disc 1807 by an object lens 1806.

Blue light 1822 reflected from the data layer 1831 again passes through the object lens 1806 and thereby turns into parallel light. After passing through the quarter wave plate 1804, the blue light 1822 is changed into linearly polarized light orthogonal to the blue light immediately after being emitted from the blue LD 1801. Thereby, the blue light 1822 is reflected by the PBS 1803 and then is condensed on a photo detector 1809 by a condensing lens 1808. The photo detector 1809 has a structure in which an RF signal and a TES can be generated. Various computing is performed on a signal S1801 generated from the blue light 1822, whereby an RF signal and a TES are generated The blue light 1822 is divided into three beams by an unillustrated diffraction grating and is condensed on the data layer 1831 of the optical disc 1807. The pickup has a configuration capable of the tracking servo using not only the PP method and the DPD method but also other PP and DPD methods based on only one spot of the three beams. This enables a configuration in which recording or reproduction can be performed on spots on an outer circumferential side while performing the tracking servo on a track on an inner circumferential side.

Since an optical disc device including the optical pickup having the aforementioned configuration has the same configuration as in FIG. 7, a detailed description of the configuration will be omitted.

The following describes how a recommended recording condition is determined for the optical disc having the cross section shown in FIG. 15 by using the optical disc device in this embodiment. Firstly, the optical disc device performs tracking servo at one of spots of the three beams, the spot being on recording pits or marks in which data signals are already recorded. Note that the DPD method is used for the servo method. In a case of a spiral structure including pits or marks recorded in an outer circumferential direction, the tracking servo is performed on a spot on the inner circumferential side. In a case of a spiral structure in an inner circumferential direction, the tracking servo is performed on a spot on the outer circumferential side. This means that scanning of a spot located in between used for recording/reproduction is always performed on an unrecorded portion. Use of the in-between spot enables recording. The recommended recording condition determination in this state is executed based on the flowchart shown in FIG. 9, as in the first embodiment. Thereby, the recommended recording condition is determined by the same procedure as in the first embodiment. By recording information by using the determined recommended recording condition, the tracking servo can be performed on recording signals.

Seventh Embodiment

This embodiment describes a recording adjusting method performed in a case of recording using the grooveless disc and the optical disc device which have been described in the first embodiment. The recording adjusting method is performed based on a flowchart shown in FIG. 17. Note that the write strategy information and the OPC parameters determined based on the recommended recording condition of the grooveless disc are stored in the management information of the grooveless disc, and the management information includes a PP-TES amplitude and a DPD relative time difference. The management information also includes desirable values and tolerances of fluctuation amounts of the PP-TES amplitude as well as the linearity and the asymmetry thereof near the track center. A configuration of the grooveless disc and the optical disc device, a recommended recording condition determination method, and a method of determining OPC parameters and the like recorded in the management information are the same as in the first embodiment. Thus, a detailed description will be herein omitted.

Figure 17:
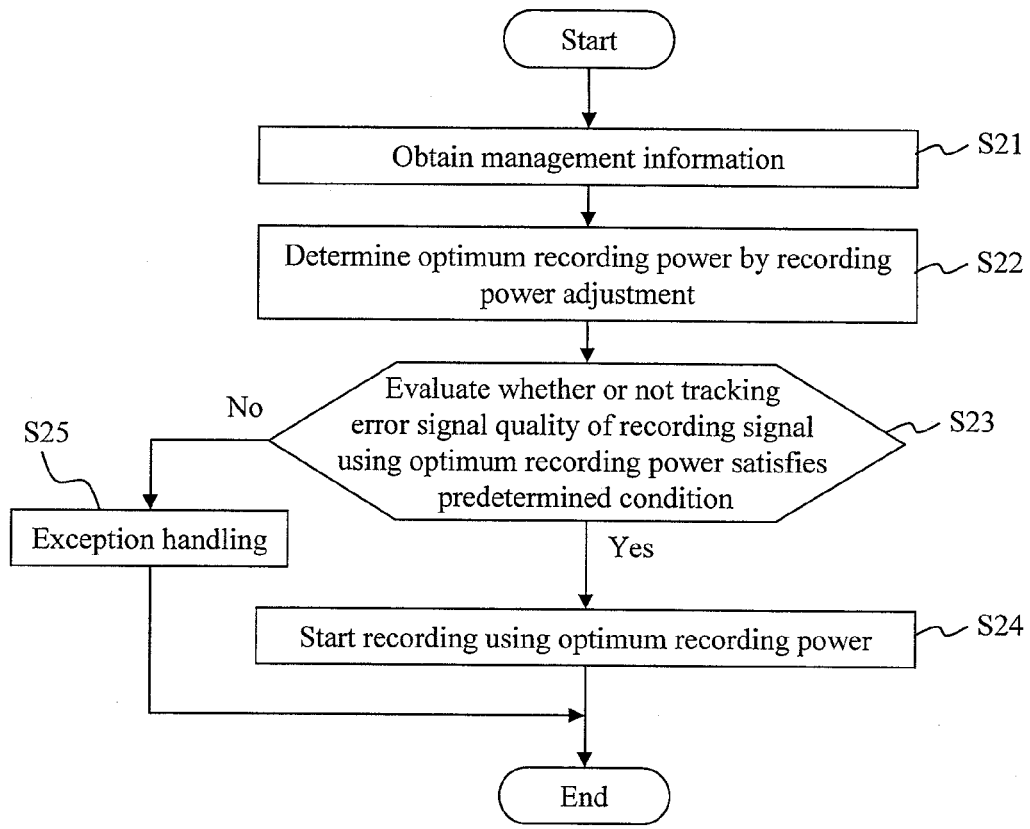
FIG. 17 is an exemplary flowchart of a recording adjustment method of the present invention.

Prior to the start of OPC, the optical disc device performs reproduction on a management region of the optical disc, obtains OPC parameters of the optical disc, and stores the OPC parameters in the OPC parameter storage unit 805 in FIG. 8 (Step S21 in FIG. 17). At this time, recording conditions such as the recording rate and the recording waveform on which the OPC parameters are based are obtained and stored in the recording condition storage unit 802. When being regarded as the OPC parameters, these recording conditions may be stored in the OPC parameter storage unit 805. After obtaining the management information, the optical disc device determines the optimum recording power in Step S22. This time, the determination is made by the kappa method. The optical disc device sets the recording waveform and the multiple types of recording powers according to the information in the OPC parameter storage unit 805 and the recording condition storage unit 802, and then performs trial writing in the trial writing region of the optical disc. In the trial writing, random signals and mark-space repetition patterns having the same signal duration are recorded. The optical disc device reproduces the recorded trial writing signals and stores, in the reproduction signal storage unit 803, relationships between the recording power and the modulation degree which are obtained from the signals under the recording conditions. Based on the relationships between the recording power obtained from the recording condition storage unit 802 and the modulation degree obtained from the reproduction signal storage unit 803 and based on the OPC parameters obtained from the OPC parameter storage unit 805, the recording power determination unit 806 performs the OPC using the kappa method and consequently determines an optimum recording power (S22).

Next, in Step S23, the optical disc device evaluates whether the TES quality of a recording signal using the optimum recording power satisfies predetermined conditions. This evaluation corresponds to confirmation of whether the recording condition including the resultant optimum recording power matches the recommended recording condition in the management information of the optical disc and thus a TES of a favorable quality can be obtained from a signal recorded under the recording condition. Thus, the predetermined conditions in Step S23 are the PP-TES amplitude, the DPD relative time difference, and desired values and tolerances of the fluctuation amounts of the PP-TES amplitude and the DPD relative time difference as well as the linearity and the asymmetry thereof near the track center. These have been obtained from the management information and determined based on the recommended recording condition. The confirmation is made in the following manner. By using the obtained recording conditions, random signals and/or mark-space repetition patterns having the same signal duration are recorded in such a manner that recording signals under the same recording condition are recorded in at least two adjacent tracks. Then, a TES quality obtained at a track jump between tracks including the recording signals is compared with the conditions stored in the OPC parameter storage unit 805.

When the PP method is used as the tracking servo method for recording signals, a PP-TES amplitude as well as a fluctuation amount, linearity, and asymmetry of the PP-TES amplitude may be used for the evaluation. When the DPD method is used, a DPD relative time difference as well as a fluctuation amount, linearity, and asymmetry of the DPD relative time difference may be used for the evaluation. If the TES quality satisfies the predetermined conditions, the optical disc device starts recording in Step S24 by using the determined optimum recording power.

However, if the OPC fails due to a trial writing error or a modulation degree detection error, the recording condition obtained as the result of the OPC does not match the recommended recording condition, and thus the TES does not satisfy the predetermined conditions. The processing moves to an exception handling in Step S25. This shows a successful detection of a failure of appropriate OPC due to inconsistency between the TES quality in the recording performed under the obtained recording condition and the desired value thereof. Accordingly, in the exception handling in Step S25, an instruction for moving to re-execution of the OPC, abort of the recording operation or the like is given to prevent recording from being performed under a erroneously determined recording condition.

As described above, the OPC accuracy is enhanced by comparing the TES quality of a signal recorded under a recording condition obtained by OPC using the kappa method, and tracking servo can be performed by using the recording signal.

In this embodiment, the description has been given while the indicator of the TES quality obtained from a recording signal is represented by the PP-TES amplitude or the DPD relative time difference. However, the same effect can naturally be obtained by using the DPD-TES amplitude or the DPD input signal amplitude.

Meanwhile, a difference in performance among parts of optical disc devices causes a variation of absolute values of the PP-TES amplitude and the DPD input signal amplitude. Hence, a value obtained by normalizing the performances based on a reproduction signal level may be used as an indicator of the TES quality evaluation. In this case, a TES is obtained as a ratio of an amplitude to a reproduction signal level, and thus a common desired value of the TES quality can be utilized at least regardless of a difference in photo-detector reception sensitivity and amplification ratio among the optical disc devices. In OPC in each optical disc device, normalized values based on the reproduction signal level may be used as the PP-TES amplitude and the DPD input signal amplitude to be measured and may be compared with their desired values. The technique of using, as the TES quality indicator, values obtained by normalizing the PP-TES amplitude and the DPD input signal amplitude based on the reproduction signal level in such a manner is applicable to any indicator of the TES quality used in the first to fifth embodiments.

When, unlike the aforementioned method, both the PP method and the DPD method are to be ensured as the tracking servo in reproduction, it may be confirmed whether both the PP-TES amplitude and the DPD-TES amplitude as well as the DPD input signal amplitude or the DPD relative time difference satisfy the allowable values in the management information. Thereby, the tracking servo can be performed by using the recording signal by any of the PP method and the DPD method.

In the aforementioned method, the method using a track jump has been described as a method for measuring the TES quality. In another method, while a spot of red light under tracking servo in reproducing a recording signal is detracked by a certain amount, the TES quality of the recording signal may be measured at a spot of blue light emitted onto a data layer.

In the aforementioned method, signals are recorded in at least two tracks by using the recording condition obtained as the result of OPC, so that the TES quality is measured. In the recording, all of the signals recorded in the two tracks are not required to be recorded under the same recording condition. What is required is to record any adjacent signals under the same recording condition. This can reduce a region used for the trial writing.

Meanwhile, suppose a case where the PP-TES amplitude in the aforementioned method is defined as a sum of absolute values obtained in the following manner. Specifically, detracking is performed by using a value of plus and minus ¼ of the track from the center thereof, and each of resultant PP-TESes is divided by a sum level ((A+B) signal in the photo detector 101a in FIG. 1A). In this case, an allowable value of the PP-TES amplitude in step S23 may be a PP-TES amplitude not less than 0.10 and not greater than 0.35. In addition, a fluctuation amount of the PP-TES amplitude may be defined as a value obtained by dividing a difference between a maximum value and a minimum value of the PP-TES amplitude by a sum of the maximum value and the minimum value. A tolerance of the fluctuation amount may be 0.25 or lower.

The DPD relative time difference in the aforementioned method may be defined as a value obtained at the time of 50 nm detracking from the track center. A tolerance thereof in step S23 may be set to a DPD relative time difference not less than 0.28 and not greater than 0.62. The shift amount (asymmetry) of the amplitude center of the DPD relative time difference may be obtained in the following manner. Specifically, detracking is performed by using a value of plus and minus ¼ of the track from the center therefrom, and a difference between absolute values of DPD relative time differences at the time of the detracking is divided by a sum of the absolute values. A tolerance thereof may be 0.20 or lower.

In the aforementioned method, the optimum recording power determination in Step S22 is made based on the kappa method. How to determine the optimum recording power is not limited to this method. A method using the desired beta value which is an OPC parameter may be used. The value beta is an indicator of an error from the amplitude center of a long signal and the amplitude center of a short signal and is a parameter specific to a medium. In this method, the trial writing is performed by using multiple types of recording powers, and a value beta obtained in reproducing each trial writing signal is compared with the desired beta value which is the OPC parameter. A recording power whose beta value matches the desired beta value is determined as an optimum recording power. The TES quality obtained from a recording signal under a recording condition including the thus determined optimum recording power is evaluated in Step S23. The evaluation makes it possible to confirm whether a favorable TES can be acquired in the recording under the determined recording condition and consequently ensures that the tracking servo is performed by using the recording signal.

Eighth Embodiment

This embodiment describes a case of changing the optical disc in the seventh embodiment. Since unchanged part of the method is the same as in the seventh embodiment, a detailed description thereof will be omitted.

In this embodiment, pits or recording marks are formed in a spiral structure in the servo surface 502 in the optical disc shown in FIG. 5. The write strategy information and the OPC parameters determined based on the recommended recording condition of the optical disc are stored in the management information of the optical disc. The management information includes a recommended recording waveform, OPC parameters determined from the recommended recording condition and to be used for the kappa method, a PP-TES amplitude, and a DPD relative time difference. The management information also includes desirable values and tolerances of fluctuation amounts of the PP-TES amplitude and the DPD relative time difference as well as the linearity and the asymmetry thereof near the track center.

The optical disc device (FIG. 7) performs the tracking servo on this optical disc by using the red light. At this time, the tracking servo is performed by the DPD method. The recording adjusting method for the data layers 501 of the optical disc is determined by exactly the same method as in the seventh embodiment. By recording information in the data layers by using the determined recording condition, the tracking servo can be performed on recording signals.

Ninth Embodiment

This embodiment describes a case of changing the optical disc in the seventh embodiment. Since unchanged part of the method is the same as in the seventh to eighth embodiments, a detailed description thereof will be omitted.

This embodiment uses an optical disc whose cross section is schematically shown in FIG. 14. The servo surface 1602 of the optical disc is located on the light incidence side and has a groove for tracking servo. The groove has a single spiral structure having alternate groups of lands and grooves, like a DVD-RAM. The grooveless data layers 1601 are arranged on the substrate side farther from the light incidence side than the servo surface 1602. The write strategy information and the OPC parameters determined based on the recommended recording condition of the optical disc are stored in the management information of the optical disc. The management information includes a recommended recording waveform, OPC parameters determined from the recommended recording condition and to be used for the kappa method, a PP-TES amplitude, and a DPD relative time difference. The management information also includes desirable values and tolerances of fluctuation amounts of the PP-TES amplitude and the DPD relative time difference as well as the linearity and the asymmetry thereof near the track center.

The optical disc device (FIG. 7) performs the tracking servo on this optical disc by using the red light. At this time, the tracking servo is performed by the PP method. The recommended recording condition for the data layers 1601 of the optical disc is determined by the same method as in the seventh embodiment. By recording information in the data layers by using the determined recording condition, the tracking servo can be performed on recording signals.

Tenth Embodiment

This embodiment describes a case of changing the optical disc in the seventh embodiment. Since unchanged part of the method is the same as in the seventh to ninth embodiments, a detailed description thereof will be omitted.

This embodiment uses an optical disc whose cross section is schematically shown in FIG. 15. The optical disc does not include a servo surface but includes the grooveless data layers 1701 only. Several tracks include pits or recording marks which are already present in recording start portions of the data layers. The write strategy information and the OPC parameters determined based on the recommended recording condition of the optical disc are stored in the management information of the optical disc. The management information includes a recommended recording waveform, OPC parameters determined from the recommended recording condition and to be used for the kappa method, a PP-TES amplitude, and a DPD relative time difference. The management information also includes desirable values and tolerances of fluctuation amounts of the PP-TES amplitude and the DPD relative time difference as well as the linearity and the asymmetry thereof near the track center.

FIG. 16 is a configuration of an optical pickup used for recording and reproduction on the optical disc. The pickup uses almost the same optical system as that used for BD recording and reproduction. The blue LD 1801 having a wavelength of 405 nm is used as laser used for recording and reproduction and recording mark servo. Blue light emitted from the blue LD 1801 turns into parallel light through the collimating lens 1802, passes through the PBS 1803, and turns into circularly polarized light through the quarter wave plate 1804. The blue light which has turned into the circularly polarized light is condensed on one of the data layers 1831 of the optical disc 1807 by the object lens 1806.

The blue light 1822 reflected from the data layer 1831 again passes through the object lens 1806 and thereby turns into parallel light. After passing through the quarter wave plate 1804, the blue light 1822 is changed into linearly polarized light orthogonal to the blue light immediately after being emitted from the blue LD 1801. Thereby, the blue light 1822 is reflected by the PBS 1803 and then is condensed on the photo detector 1809 by the condensing lens 1808. The photo detector 1809 has a structure in which an RF signal and a TES can be generated. Various computing is performed on the signal S1801 generated from the blue light 1822, whereby an RF signal and a TES are generated.

The blue light 1822 is divided into three beams by an unillustrated diffraction grating and is condensed on the data layer 1831 of the optical disc 1807. The pickup has a configuration capable of the tracking servo using not only the PP method and the DPD method but also other PP and DPD methods based on only one spot of the three beams. This enables a configuration in which recording or reproduction can be performed on spots on an outer circumferential side while performing the tracking servo on a track on an inner circumferential side.

Since an optical disc device including the optical pickup having the aforementioned configuration has the same configuration as in FIG. 7, a detailed description of the configuration will be omitted.

The following describes how a recommended recording condition is determined for the optical disc in FIG. 15 by using the optical disc device in this embodiment. Firstly, the optical disc device performs tracking servo at one of spots of the three beams, the spot being on recording pits or marks in which data signals are already recorded. Note that the DPD method is used for the servo method. In a case of a spiral structure including pits or marks recorded in an outer circumferential direction, the tracking servo is performed on a spot on the inner circumferential side. In a case of a spiral structure in an inner circumferential direction, the tracking servo is performed on a spot on the outer circumferential side. This means that scanning of a spot located in between used for recording/reproduction is always performed on an unrecorded portion. Use of the in-between spot enables recording. The recording adjusting method in this state is executed based on the flowchart shown in FIG. 17, as in the seventh embodiment. Thereby, the recording condition is determined by the same procedure as in the seventh embodiment. By recording information by using the determined recording condition, the tracking servo can be performed on recording signals.

Eleventh Embodiment

This embodiment describes a case of changing the method of adjusting a recording power (OPC) in Step S22 in the seventh embodiment. Since unchanged part of the method is the same as in the seventh embodiment, a detailed description thereof will be omitted.

This embodiment describes an OPC method using desired values of the TES quality. The optical disc device sets the recording waveform and the multiple types of recording powers according to the information in the OPC parameter storage unit 805 and the recording condition storage unit 802 and performs trial writing in the trial writing region of the optical disc. In the trial writing, random signals and/or mark-space repetition patterns having the same signal duration are recorded in such a manner that recording signals under the same recording condition are recorded in at least two adjacent tracks. The optical disc device reproduces the recorded trial writing signals, obtains a PP-TES amplitude and a DPD relative time difference of the recording powers at a track jump, and stores them in the servo signal storage unit 804 in FIG. 8.

Figure 18:
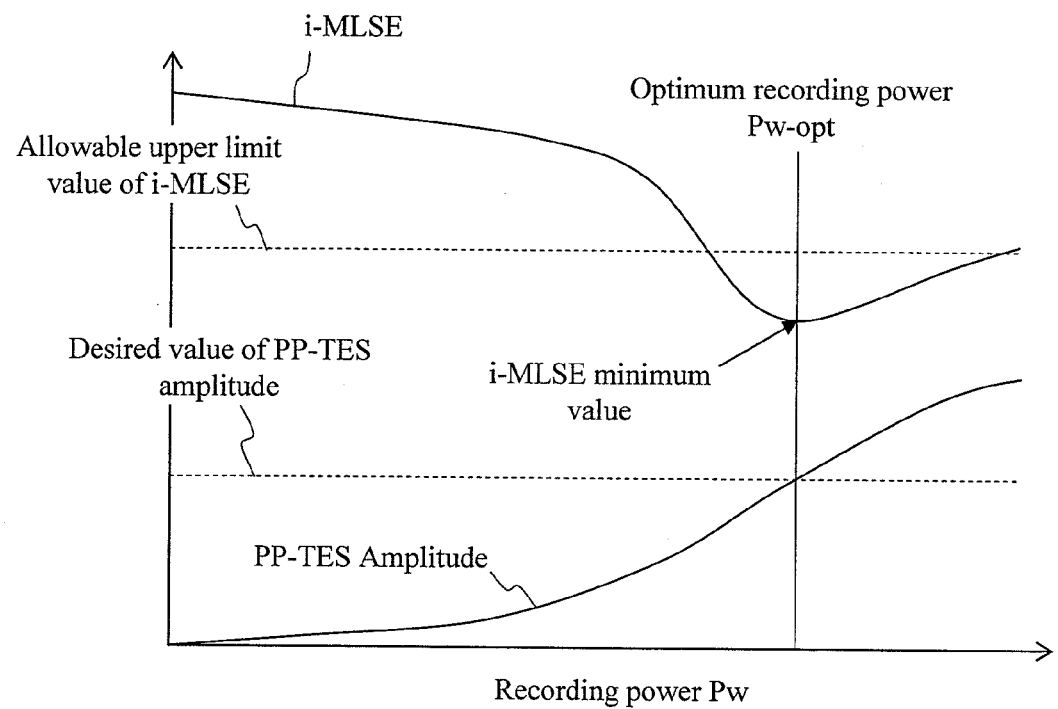
FIG. 18 is an exemplary graph showing relationships of a recording power Pw in recording power adjustment using a desired PP-TES value with a PP-TES amplitude and i-MLSE.

FIG. 18 shows exemplary relationships of a recording power with TES qualities, which are obtained at this time. The vertical axis in FIG. 18 represents a PP-TES amplitude. FIG. 18 also shows i-MLSE which is an indicator of a reproduction signal quality of a trial writing signal at each recording power. An optimum recording power in OPC in this embodiment is determined as a recording power providing a PP-TES amplitude matching a desired PP-TES amplitude value obtained from the OPC parameter storage unit 805. Thus, a recording power at an intersection between the PP-TES amplitude and the desired PP-TES amplitude value in FIG. 18 is determined as an optimum recording power in OPC. At the recording power, i-MLSE representing the signal quality of the trial writing signal exhibits the minimum value, which shows that the optimum recording power can be determined appropriately.

In the recording adjustment in FIG. 17, in the succeeding Step S23, the optical disc device evaluates whether the TES quality of the recording signal using the optimum recording power satisfies predetermined conditions. When the PP-TES amplitude is to be evaluated, the processing moves to Step S24 to start recording using the optimum recording power, because correspondence between the PP-TES amplitude and the desired value has been ensured in Step S22. If tracking servo using the DPD method as well as the PP method is required to be ensured, a DPD relative time difference, a DPD input signal amplitude, a value obtained by normalizing the DPD input signal amplitude based on a reproduction signal level, a DPD-TES amplitude or the like, for example, is evaluated in Step S23.

By recording a signal on the basis of the recording power determined in the aforementioned method, favorable signal and TES qualities are obtained from the recording signal, enabling the tracking servo using the recording signal.

In this embodiment, OPC is performed by using the PP-TES amplitude. However, when the OPC is performed by using a DPD input signal amplitude, a value obtained by normalizing a PP-TES amplitude or a DPD input signal amplitude based on a reproduction signal level, a DPD-TES amplitude, a DPD relative time difference or the like, the same effect can also be obtained.

In this embodiment, the recording power at which a PP-TES amplitude matches a desired value thereof is determined as the optimum recording power. However, the optimum recording power determination may be made again later to obtain the best recording signal quality. For example, trial writing is performed by using a power close to the determined optimum recording power, and a determination may be made again later that the following recording power is an optimum recording power. Specifically, the recording power has: the best recording signal quality in the trial writing; and the TES quality equal to or higher than the lower limit value of the TES quality. Thereby, at least tracking servo using a recording signal is ensured, which can enhance the quality of the recording signal.

If the optimum recording power is determined in Step S22 by using a signal using the DPD method unlike the aforementioned method, in Step S22 a DPD relative time difference or the like is used as an indicator, and the optimum recording power is determined so that the DPD relative time difference can match the desired value thereof in the management information. If the PP method is to be ensured in addition to the DPD relative time difference ensured in Step S23, the PP-TES amplitude may be evaluated as an indicator of whether to satisfy an allowable value, in Step S23. Anyhow, the tracking servo using the recording signal is ensured in Step S24.

In the aforementioned method, the method using a track jump has been described as a method of measuring the TES quality. In another method, the TES quality of the recording signal at a spot of blue light emitted onto a data layer may be measured while detracking, by a certain amount, a spot of red light under tracking servo in reproducing a recording signal.

Meanwhile, suppose a case where the PP-TES amplitude in the aforementioned method is defined as a sum of absolute values obtained in the following manner. Specifically, detracking is performed by using a value of plus and minus ¼ of the track from the center thereof, and each of resultant PP-TESes is divided by a sum level ((A+B) signal in the photo detector 101a in FIG. 1A). In this case, an allowable value of the PP-TES amplitude in step S23 may be a PP-TES amplitude not less than 0.10 and not greater than 0.35. In addition, a fluctuation amount of the PP-TES amplitude may be defined as a value obtained by dividing a difference between a maximum value and a minimum value of the PP-TES amplitude by a sum of the maximum value and the minimum value. A tolerance of the fluctuation amount may be 0.25 or lower.

The DPD relative time difference in the aforementioned method may be defined as a value obtained at the time of 50 nm detracking from the track center. A tolerance thereof in step S23 may be set to a DPD relative time difference not less than 0.28 and not greater than 0.62. The shift amount (asymmetry) of the amplitude center of the DPD relative time difference may be obtained in the following manner. Specifically, detracking is performed by using a value of plus and minus ¼ of the track from the center therefrom, and a difference between absolute values of DPD relative time differences at the time of the detracking is divided by a sum of the absolute values. A tolerance thereof may be 0.20 or lower.

The recording adjusting method in this embodiment is applicable to the optical disc described in the eight to tenth embodiments. With the recording signal using the recording condition provided as the result of the recording adjustment, the tracking servo can be performed.

It should be noted that the present invention is not limited to the embodiments described above and includes various modifications. For example, the aforementioned embodiments have been described in detail for easy understanding of the present invention and are not necessarily limited to ones having all of the described configurations. Part of the configuration of a certain embodiment can be replaced with the configuration of another embodiment. The configuration of a certain embodiment can be added to the configuration of another embodiment. In addition, part of the configuration of any of the embodiments can be added to, deleted from, or replaced with any of the other embodiments.

Part or all of the configurations, the functions, the processing units, a processing means, and the like which are described above may be implemented by hardware, for example, by designing them using integrated circuits. The configurations and the functions which are described above may be implemented by software by a processor's interpreting and executing programs implementing the respective functions. The program implementing the functions and information such as a table and a file may be accommodated in a recording device such as a memory, a hard disk or a solid state drive (SSD), or a recording medium such as an IC card, an SD card or a DVD.

EXPLANATION OF REFERENCE NUMERALS

101a . . . photo detector, 102a . . . subtractor, 101b . . . light spot, 102b . . . groove, 103b . . . light spot, 104b . . . pit, 201a . . . 4-part photo detector, 202a . . . adder, 203a . . . high-frequency booster, 204a . . . binarizer, 205a . . . phase difference detector, 206a . . . low-pass filter (LPF), 207a . . . subtractor, S211 . . . A+C input signal, S212 . . . B+D input signal, S221 . . . A+C binary signal, S222 . . . B+D binary signal, S231 . . . leading phase pulse signal, S232 . . . lagging phase pulse signal, S241 . . . leading phase pulse signal after LPF, S242 . . . lagging phase pulse signal after LPF, 201b . . . light spot, 202b . . . recording mark or pit, S250 . . . differential signal between leading phase pulse and lagging phase pulse, 501 . . . data layer, recording film, 502 . . . servo surface, 601 . . . red LD, 602 . . . collimating lens, 603 . . . PBS, 604 . . . quarter wave plate, 605 . . . dichroic mirror, 606 . . . object lens, 607 . . . optical disc, 608 . . . condensing lens, 609 . . . photo detector, S601 . . . signal from red light, 610 . . . blue LD, 611 . . . collimating lens, 612 . . . PBS, 613 . . . quarter wave plate, 614 . . . condensing lens, 615 . . . photo detector, S602 . . . signal from blue light, 621 . . . red light, 622 . . . blue light, 631 . . . data layer, recording film, 632 . . . servo surface, 701 . . . optical disc, 702 . . . spindle motor, 703 . . . controller, 704 . . . LD drive unit, 705 . . . optical pickup unit, 706 . . . laser light, 707 . . . servo signal processor, 708 . . . RF signal processor, 709 . . . decoder, 710 . . . encoder, 801 . . . recording power adjustment unit in controller, 802 . . . recording condition storage unit, 803 . . . reproduction signal storage unit, 804 . . . servo signal storage unit, 805 . . . OPC parameter storage unit, 806 . . . recording power determination unit, 807 . . . parameter storage unit, 1001 . . . optical disc, 1002 . . . management information region, 1003 . . . disc information (DI), 1004 . . . defect management information, 1005 . . . trial writing region, 1601 . . . data layer, recording film, 1602 . . . servo surface, 1701 . . . data layer, recording film, 1801 . . . blue LD, 1802 . . . collimating lens, 1803 . . . PBS, 1804 . . . quarter wave plate, 1806 . . . object lens, 1807 . . . optical disc, 1808 . . . condensing lens, 1809 . . . photo detector, S1801 . . . signal from blue light, 1822 . . . blue light, 1831 . . . data layer, recording film

What is claimed is:

1. A recommended recording condition determination method, of writing trial writing signals on a grooveless optical disc under a plurality of recording condition settings, including for a recording waveform and a recording power, and of determining a recommended combination of recording condition settings based on the trial writing signals, the method comprising the steps of:
   obtaining a reproduction signal quality of each of the trial writing signals;
   obtaining a tracking error signal quality of each of the trial writing signals; and
   determining, from among the recording condition settings, the recommended combination of recording condition settings which exhibits: the reproduction signal quality satisfying a predetermined condition, and the tracking error signal quality being at a level that enables a tracking servo to be performed by using a recording signal.

2. A recommended recording condition determination method, of writing trial writing signals on an optical disc under a plurality of types of recording conditions, including a recording waveform and a recording power, and of determining a recommended recording condition based on the trial writing signals, the method comprising the steps of:

obtaining a reproduction signal quality of each of the trial writing signals;

obtaining a tracking error signal quality from each trial writing signal; and determining the recommended recording condition from among the recording conditions, which exhibits the reproduction signal quality satisfying a predetermined condition and the tracking error signal quality satisfying a predetermined condition;

wherein the reproduction signal quality is determined by using at least one of: a bit error rate (bER), a maximum likelihood sequence error (MLSE), an integrated maximum likelihood sequence error (i-MLSE), a jitter, and a run-length-limited sequence error for adaptive target (L-SEAT).

3. The recommended recording condition determination method according to claim 1, wherein the tracking error signal quality is determined by using at least one of: a PP-TES amplitude, a PP-TES amplitude normalized based on a sum signal level, a DPD-TES amplitude, a DPD relative time difference, a DPD input signal amplitude, a DPD input signal amplitude normalized based on a sum signal level, a fluctuation amount of the PP-TES amplitude normalized based on a sum signal level, and an asymmetry of the DPD relative time difference.

4. A recommended recording condition determination method, of writing trial writing signals on an optical disc under a plurality of types of recording conditions, including a recording waveform and a recording power, and of determining a recommended recording condition based on the trial writing signals, the method comprising the steps of:

obtaining a reproduction signal quality of each of the trial writing signals;

obtaining a tracking error signal quality from each trial writing signal; and determining the recommended recording condition from among the recording conditions, which exhibits the reproduction signal quality satisfying a predetermined condition and the tracking error signal quality satisfying a predetermined condition;

wherein the step of obtaining the tracking error signal quality includes a step of performing a track jump between adjacent tracks having signals recorded under the same recording conditions; and wherein the tracking error signal quality is obtained from a tracking error signal obtained at the track jump.

5. A recommended recording condition determination method, of writing trial writing signals on an optical disc under a plurality of types of recording conditions, including a recording waveform and a recording power, and of determining a recommended recording condition based on the trial writing signals, the method comprising the steps of:

obtaining a reproduction signal quality of each of the trial writing signals;

obtaining a tracking error signal quality from each trial writing signal; and determining the recommended recording condition from among the recording conditions, which exhibits the reproduction signal quality satisfying a predetermined condition and the tracking error signal quality satisfying a predetermined condition;

wherein the step of obtaining the tracking error signal quality includes a step of offsetting a reproduction spot from the track center by a predetermined amount; and wherein the tracking error signal quality is obtained from a tracking error signal obtained at the offset by the predetermined amount.

6. A recording adjusting method comprising the steps of:

writing a plurality of trial writing signals on a grooveless optical disc by using a plurality of levels of recording power, and then determining an optimum recording power based on the trial writing signals;

obtaining a tracking error signal quality from a recording signal recorded by using the determined optimum recording power; and using the determined optimum recording power to record information, when the tracking error signal quality is at a level that enables a tracking servo to be performed by using a recording signal.

7. A recording adjusting method comprising the steps of:

writing trial writing signals on an optical disc by using a plurality of levels of recording power, and then determining an optimum recording power based on the trial writing signals;

obtaining a tracking error signal quality from a recording signal recorded by using the determined optimum recording power; and using the determined optimum recording power to record information, when the tracking error signal quality satisfies a predetermined condition;

wherein the step of determining the optimum recording power includes the steps of:

obtaining a modulation degree m(Pw) from a reproduction signal amplitude of each of the trial writing signals written using the plurality of levels of recording power Pw, calculating an evaluation value Pw×m(Pw) that is a product of each recording power Pw and the modulation degree m(Pw), approximating, near the recording power Pw, a characteristic of a relationship between the evaluation value Pw×m(Pw) and the recording power Pw by a line, calculating a recording power Pw at a point in the approximation line at which the evaluation value Pw×m(Pw) is zero, as a recording power threshold Pth(Pw), and determining a recording power Pw at which a ratio of the recording power Pw to the recording power threshold Pth(Pw) matches a parameter kappa specific to the optical disc, and multiplying the determined recording power Pw by a parameter pai specific to the optical disc, thereby obtaining a value of the optimum recording power.

8. A recording adjusting method comprising the steps of:

writing trial writing signals on an optical disc by using a plurality of levels of recording power and then determining an optimum recording power based on the trial writing signals;

obtaining a tracking error signal quality from a recording signal recorded by using the determined optimum recording power; and using the determined optimum recording power to record information, when the tracking error signal quality satisfies a predetermined condition;
wherein the step of determining an optimum recording power includes:
a step of obtaining a value beta from a reproduction signal of each of the trial writing signals written using the plurality of levels of recording power, the value beta being an indicator of an erroneous difference between the amplitude center of a long signal and the amplitude center of a short signal; and
a step of determining the optimum recording power to be a recording power at which the value beta matches a desired beta value being a parameter specific to the optical disc.

9. A recording adjusting method comprising the steps of:
writing trial writing signals on a grooveless optical disc by using a plurality of levels of recording power and then determining an optimum recording power based on the trial writing signals;
obtaining a tracking error signal quality from a recording signal recorded by using the determined optimum recording power; and
using the determined optimum recording power to record information, when the tracking error signal quality satisfies a predetermined condition;
wherein the tracking error signal quality is determined by using at least one of: a PP-TES amplitude, a PP-TES amplitude normalized based on a reproduction signal level, a DPD-TES amplitude, a DPD relative time difference, a DPD input signal amplitude, a DPD input signal amplitude normalized based on a sum signal level, a fluctuation amount of the PP-TES amplitude normalized based on a sum signal level, and an asymmetry of the DPD relative time difference.

10. A recording adjusting method comprising the steps of:
writing trial writing signals on an optical disc by using a plurality of levels of recording power and then determining an optimum recording power based on the trial writing signals;
obtaining a tracking error signal quality from a recording signal recorded by using the determined optimum recording power; and
using the determined optimum recording power to record information, when the tracking error signal quality satisfies a predetermined condition;
wherein the step of obtaining the tracking error signal quality includes a step of performing a track jump between adjacent tracks having signals recorded under the same recording conditions; and
wherein the tracking error signal quality is obtained from a tracking error signal obtained at the track jump.

11. A recording adjusting method comprising the steps of:
writing trial writing signals on an optical disc by using a plurality of levels of recording power and then determining an optimum recording power based on the trial writing signals;
obtaining a tracking error signal quality from a recording signal recorded by using the determined optimum recording power; and
using the determined optimum recording power to record information, when the tracking error signal quality satisfies a predetermined condition;
wherein the step of obtaining the tracking error signal quality includes a step of offsetting a reproduction spot from the track center by a predetermined amount; and
wherein the tracking error signal quality is obtained from a tracking error signal obtained at the offset by the predetermined amount.

12. The recording adjusting method according to claim 6, wherein
the predetermined condition is stored in a management region of the grooveless optical disc.

13. A recording adjusting method, of writing a plurality of trial writing signals on a grooveless optical disc under a plurality of levels of recording power, and of determining an optimum recording power based on the trial writing signals, the method comprising the steps of:
obtaining a tracking error signal quality from a tracking error signal obtained from each of the signals recorded by using the plurality of levels of recording power; and
determining, as the optimum recording power, a recording power having the tracking error signal quality at a level that enables a tracking servo to be performed by using a recording signal.

14. The recording adjusting method according to claim 13, wherein the tracking error signal quality is determined by using at least one of: a PP-TES amplitude, a PP-TES amplitude normalized based on a reproduction signal level, a DPD-TES amplitude, a DPD relative time difference, a DPD input signal amplitude, and a DPD input signal amplitude normalized based on a reproduction signal level.

15. A recording adjusting method, of writing trial writing signals on an optical disc under a plurality of levels of recording power, and of determining an optimum recording power based on the trial writing signals, the method comprising the steps of:
obtaining a tracking error signal quality from a tracking error signal obtained from each of the signals recorded by using the plurality of levels of recording power; and
determining, as the optimum recording power, a recording power having the tracking error signal quality of a predetermined value;
wherein the step of obtaining the tracking error signal quality includes a step of performing a track jump between adjacent tracks having signals recorded under the same recording conditions; and
wherein the tracking error signal quality is obtained from a tracking error signal obtained at the track jump.

16. A recording adjusting method, of writing trial writing signals on an optical disc under a plurality of levels of recording power, and of determining an optimum recording power based on the trial writing signals, the method comprising the steps of:
obtaining a tracking error signal quality from a tracking error signal obtained from each of the signals recorded by using the plurality of levels of recording power; and
determining, as the optimum recording power, a recording power having the tracking error signal quality of a predetermined value;
wherein the step of obtaining the tracking error signal quality includes a step of offsetting a reproduction spot from the track center by a predetermined amount; and
wherein the tracking error signal quality is obtained from a tracking error signal obtained at the offset by the predetermined amount.

17. The recording adjusting method according to claim 13, wherein the predetermined value is stored in a management region of the grooveless optical disc.

18. A grooveless optical disc, comprising:
a management information region, with a recommended recording condition recorded therein;

wherein a desired value of a tracking error signal quality, that is at a level that enables a tracking servo to be performed by using a recording signal, is recorded in the management information region of the grooveless optical disc, and is obtained from a signal recorded under the recommended combination of recording condition settings.

19. The grooveless optical disc according to claim 18, wherein the tracking error signal quality is determined by using at least one of: a PP-TES amplitude, a PP-TES amplitude normalized based on a reproduction signal level, a DPD-TES amplitude, a DPD relative time difference, a DPD input signal amplitude, and a DPD input signal amplitude normalized based on a reproduction signal level.

* * * * *